(12) United States Patent
Brunza et al.

(10) Patent No.: US 11,934,521 B2
(45) Date of Patent: Mar. 19, 2024

(54) SYSTEM AND METHOD OF SITUATION AWARENESS IN INDUSTRIAL CONTROL SYSTEMS

(71) Applicant: SONALYSTS, INC., Waterford, CT (US)

(72) Inventors: Scott Brunza, Waterford, CT (US); Timothy Ouellette, Waterford, CT (US); William Russ, Waterford, CT (US); Stephen Dorton, Waterford, CT (US)

(73) Assignee: SONALYSTS, INC., Waterford, CT (US)

( * ) Notice: Subject to any disclaimer, the term of this patent is extended or adjusted under 35 U.S.C. 154(b) by 408 days.

(21) Appl. No.: 17/236,402

(22) Filed: Apr. 21, 2021

(65) Prior Publication Data

US 2022/0342988 A1    Oct. 27, 2022

(51) Int. Cl.
*G06F 21/55* (2013.01)
*G06F 21/50* (2013.01)
(Continued)

(52) U.S. Cl.
CPC ............ *G06F 21/554* (2013.01); *G06F 21/50* (2013.01); *G06F 21/552* (2013.01);
(Continued)

(58) Field of Classification Search
CPC ........ G06F 21/50; G06F 21/55; G06F 21/552; G06F 21/554; G06F 21/56; G06F 21/566;
(Continued)

(56) References Cited

U.S. PATENT DOCUMENTS 8,468,599 B2    6/2013  McCusker et al.
10,205,733 B1*  2/2019  Park .................... H04L 63/18
(Continued)

OTHER PUBLICATIONS

Mauro Andreolini, et al., "A Framework for the Evaluation of Trainee Performance in Cyber Range Exercises", Mobile Networks and Applications, vol. 25, Dec. 2, 2019, pp. 236-247 (Abstract only).

(Continued)

*Primary Examiner* — Shaqueal D Wade-Wright
(74) *Attorney, Agent, or Firm* — Oblon, McClelland, Maier & Neustadt, L.L.P.

(57) ABSTRACT

A system and method for a threat monitoring device for determining, within an industrial control system over a data communication network, cross-correlated behaviors of an information technology domain, an operational technology domain, and a physical access domain and associated threats. The method includes receiving sensor data from the information technology domain, sensor data from the operational technology domain, and sensor data from the physical access domain, fusing the sensor data of each of the domains to obtain fused sensor data, determining feature sets from the fused sensor data using behavior profiles, constructing behaviors as sets of the features over time periods, classifying the behaviors to determine a degree of anomaly, classifying anomalous behaviors to determine a threat probability, generating an alert based on the degree of anomaly and the threat probability, displaying particular sensor data and particular time periods associated with the alert.

18 Claims, 16 Drawing Sheets

(51) Int. Cl.
*G06F 21/56* (2013.01)
*G06F 21/57* (2013.01)
*G06N 7/01* (2023.01)
*G06N 20/00* (2019.01)
*H04L 9/40* (2022.01)

(52) U.S. Cl.
CPC .......... G06F 21/566 (2013.01); G06F 21/577 (2013.01); G06N 7/01 (2023.01); G06N 20/00 (2019.01); H04L 63/1408 (2013.01); *G06F 2221/033* (2013.01); *H04L 63/1441* (2013.01)

(58) Field of Classification Search
CPC ... G06F 21/57; G06F 21/577; H04L 63/1408; H04L 63/14; H04L 63/1441; H04L 63/1433; H04L 63/1425; G06N 20/00; G06N 7/01
See application file for complete search history.

(56) References Cited

U.S. PATENT DOCUMENTS

| | | | | |
|---|---|---|---|---|
| 10,735,444 | B2* | 8/2020 | Murphy | G06F 21/53 |
| 2012/0072983 | A1* | 3/2012 | McCusker | H04L 63/126 726/22 |
| 2015/0058994 | A1* | 2/2015 | Honig | G06F 16/212 726/25 |
| 2017/0352102 | A1* | 12/2017 | Vavrasek | G06Q 40/08 |
| 2019/0044965 | A1 | 2/2019 | Pilkington et al. | |
| 2020/0358810 | A1 | 11/2020 | Fellows | |
| 2021/0048796 | A1* | 2/2021 | Rieger | G06F 21/82 |
| 2021/0158220 | A1* | 5/2021 | Lavid Ben Lulu | G06N 5/04 |
| 2021/0336983 | A1* | 10/2021 | Lee | H04L 63/145 |

OTHER PUBLICATIONS

Hamad Al-Mohannadi, et al., "Analysis of adversary activities using cloud-based web services to enhance cyber threat intelligence", Service Oriented Computing and Applications, vol. 14, 2020, pp. 175-187.

Hamad Al-Mohannadi, et al., "Cyber Threat Intelligence from Honeypot Data using Elasticsearch", IEEE 32$^{rd}$ International Conference on Advanced Information Networking and Applications (AINA), May 16-18, 2018, pp. 1-7.

Mikel Canizo, et al., "Implementation of a Large-Scale Platform for Cyber-Physical System Real-Time Monitoring", IEEE Access, vol. 7, 2019, pp. 52455-52466.

Joann T. Hackos, et al., "User and Task Analysis for Interface Design", General & Introductory Computer Science, Programming & Software Development, Programming, User Interface Design, Feb. 1998, 512 pages (Abstract only).

"Task Analysis", https://www.usability.gov/how-to-and-tools/methods/task-analysis.html, Sep. 30, 2020, 3 pages.

Ondrej Linda, et al., "Neural Network Based Intrusion Detection System for Critical Infrastructures", IEEE International Joint Conference on Neural Networks, Jul. 2009, pp. 1827-1834.

Pragya Paudyal, et al., "Algorithmic Opacity: Making Algorithmic Processes Transparent through Abstraction Hierarchy", Proceedings of the Human Factors and Ergonomics Society Annual Meeting, Sage Journals, vol. 62, Issue 1, Sep. 25, 2018, pp. 192-196.

Aggelos Kiayias, et al., "A Combined Fusion and Data Mining Framework for the Detection of Botnets", Catch '09: IEEE Proceedings of the 2009 Cybersecurity Applications & Technology Conference for Homeland Security, Mar. 2009, pp. 273-284.

Owen E. McCusker, et al., "DMnet™: A Botnet Detection and Mitigation Architecture", Sonalysts, Final Report for Phase II, Department of Homeland Security, DHS S&T STTR, Topic H-SB06.1-008, Nov. 13, 2009, 122 pages.

Owen McCusker, et al., "Deriving Behavior Primitives from Aggregate Network Features using Support Vector Machines", 5th International Conference on Cyber Conflict (Cycon), Version 3, 2012, pp. 1-18.

International Search Report and Written Opinion dated Jun. 22, 2022 in PCT/US2022/011523, 8 pages.

* cited by examiner

SYSTEM AND METHOD OF SITUATION AWARENESS IN INDUSTRIAL CONTROL SYSTEMS

TECHNICAL FIELD

The present disclosure is directed to a situation awareness platform that cross-correlates sensor data of information technology, operational technology, and physical access control systems, assesses cross-domain threats using a machine-learning model, and presents results of threat assessment in an explainable and trustworthy manner.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Industrial control systems, such as those used in power generation plants, are at risk for service interruptions caused by malicious attacks from physical access and operational threats and cybercriminals. Typically in industrial control systems, security threats for the information technology domain are assessed independently of an assessment of a physical access control system domain and an operational technology domain. Information technology may be monitored for cybersecurity threats based on data transmitted over a network, such as the Internet, and components that service the data transmission. Operational technology in an industrial control system, such as operations of controllers and sensors for plant and equipment, may be subject to its own separate monitoring and assessment for particular types of events. Further, a physical access control system may be used to monitor and assess the status of the plant physical security.

Conventionally, sensor and assessment data for each domain are maintained separately in order to perform specialized analysis for each domain. For example, the detection of cybersecurity threats may require specialized analysis of data transmitted over the Internet and analysis of processing performed by internet equipment for specific types of cybersecurity threats. Further, the monitoring of operational technology in a plant may require specialized analysis of plant equipment operation data based on expected operations in order to assess operation performance and efficiency. Moreover, a physical access control system may require specialized analysis of data related to physical security.

Buried in the noise of everyday network traffic, a complex threat's tactics operate over multiple time periods to challenge the detection capabilities of any network defense technology. Cybersecurity approaches are typically limited because they only identify actions coming from a single domain, listen only for known signatures, and analyze events in only one timescale. Among the challenges of a network defense technology in an industrial control system are anomalies in operational performance that might be an early sign of a possible threat to the network. Such an early sign might be overlooked as a possible threat to the network when operational performance is analyzed independently of information technology. A breach of physical security might also indicate, and might even be followed by, a possible threat to information technology and operational performance of an industrial control system. Furthermore, external conditions outside of the industrial control system, such as weather conditions, may have an impact on the industrial control system. Such external conditions may mask security threats, or may be mistaken for physical security threats. Thus, comprehensive situation awareness of complex threats requires a situation awareness capability that analyzes large volumes of past network traffic, over many sources and time periods, and factors in operational performance events and physical security to detect the present behaviors of known and unfamiliar attacks.

However, mixed disparate information technology data, plant operational data, physical security status data, as well as external condition data can become overwhelming and overly complex for plant personnel. Furthermore, the complexity of various domain data lacks information concerning possible cross-domain threats, or threats that may be indicated based on cross-domain information.

SUMMARY

In one aspect, a method is performed by a computer that has been programmed with instructions that cause the computer to function as a threat monitoring device for determining, within an industrial control system over a data communication network, cross-correlated behaviors of an information technology domain, an operational technology domain, and a physical access domain and associated threats. The method including receiving first sensor data from the information technology domain, second sensor data from the operational technology domain, and third sensor data from the physical access domain; fusing the sensor data of each of the domains to obtain fused sensor data; determining feature sets from the fused sensor data using behavior profiles; constructing behaviors as sets of the features over particular time periods; classifying the behaviors to determine a degree of anomaly; classifying anomalous behaviors to determine a threat probability; generating an alert based on the determined degree of anomaly and the determined threat probability; and displaying particular sensor data and particular time periods associated with the alert.

In a further aspect, a monitoring device for determining, within an industrial control system over a data communication network, cross-correlated behaviors of an information technology domain, an operational technology domain, and a physical access domain and associated threats. The monitoring device includes a data fusion component that receives and fuses first sensor data from the information technology domain, second sensor data from the operational technology domain, and third sensor data from the physical access domain; a data preparation component that constructs features from the fused sensor data using behavior profiles, and constructs behaviors as sets of the features over particular time periods; a threat discovery component that classifies the behaviors to determine a degree of anomaly, classifies anomalous behaviors to determine a threat probability, and generates an alert based on the determined degree of anomaly and the determined threat probability; and a presentation component that displays particular sensor data and particular time periods associated with the alert.

In a further aspect, a monitoring device for determining, within an industrial control system over a data communication network, cross-correlated behaviors of an information technology domain, an operational technology domain, and a physical access domain and associated threats. The monitoring device includes data ingestion circuitry configured to receive via a streaming service first sensor data from the information technology domain, second sensor data from the operational technology domain, and third sensor data from the physical access domain, and that receives via a bulk ingestion service the first sensor data from the information technology domain, the second sensor data from the operational technology domain, and the third sensor data from the physical access domain; data preparation circuitry configured to perform online data preparation and offline data preparation, including determining feature sets from the streamed sensor data and the bulk ingested fused sensor data using behavior profiles, and constructing behaviors as sets of the features over particular time periods; machine learning model training circuitry configured to train a plurality of domain machine learning models, including, for each domain model, mapping each domain to its own domain machine learning model, and each domain's machine learning model produces independent results, and then the machine learning model training service trains a cross-correlation machine learning model to perform cross-correlation across those domain machine learning model results to find and analyze cross-domain anomalies; machine learning model scoring circuitry configured to select selected machine learning models from among the plurality of domain machine learning models by performing a scoring process; and performance monitoring circuitry configured to evaluate the performance of the selected domain machine learning models.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
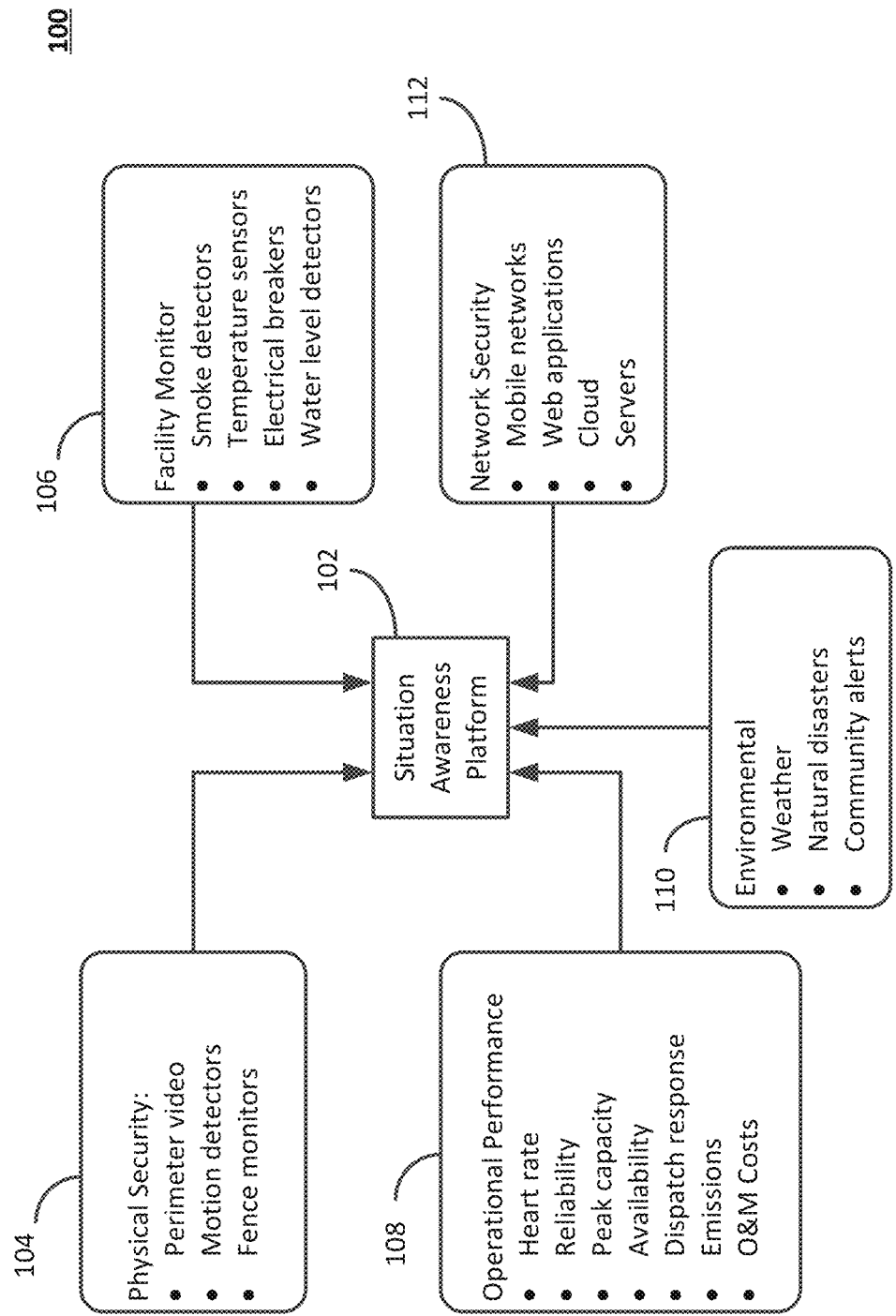
FIG. 1 is a block diagram of plant data domains for situation awareness in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to a situation awareness platform for an industrial control system that cross-correlates sensor data from several domains including information technology, operational technology, physical access control systems, and external conditions, assesses cross-domain threats using a machine learning model, and presents results of threat assessment in an explainable and trustworthy manner. Aspects of this disclosure relate to a situation awareness platform for a fossil fuel power plant, as an exemplary embodiment.

The typical approach of monitoring physical access, operational technology (OT), and Information Technology (IT) domains in separate data silos is inefficient. The separate data silos result in challenges in interpretation that can obscure or omit important correlations among the isolated data and can cause mismatches in data presentation, collection rates, storage formats, and priority. These mismatches greatly complicate attempts to perform any long-term, coordinated analysis of industrial control system security. Mismatches in timescales also tend to increase analytical imprecisions, uncertainties, and misunderstandings, and to decrease confidence in any reported findings. These challenges can lengthen the response time to security incidents by delaying a system operator's opportunity to notice potentially threatening behaviors, or by obscuring their detection altogether.

FIG. 1 is a block diagram of plant data domains for situation awareness in accordance with an exemplary aspect of the disclosure. In order to provide accurate, timely, and actionable security situation awareness and threat detection to industrial control systems, a situation awareness platform/system 102 can fuse and analyze data from multiple domains. The domains can include physical access security 104, facility monitor 106, operational performance 108, environmental condition data 110, and network security 112. Physical access security 104 can include video, motion detection, door/gate monitor, sound, and other data related to the perimeter of the plant. Facility monitor 106 can include smoke detection, temperature, electrical breaker, water level, and other physical data related to the plant interior. Operational performance 108 can include reliability, availability, peak capacity, emissions, response rates, as well as operation and maintenance costs, and even operator status indicators such as heart rate. Environmental condition data 110 can include weather conditions, community alerts, and natural disasters. Network security 112 can include status of mobile networks, web applications, cloud services, and servers.

Figure 2:
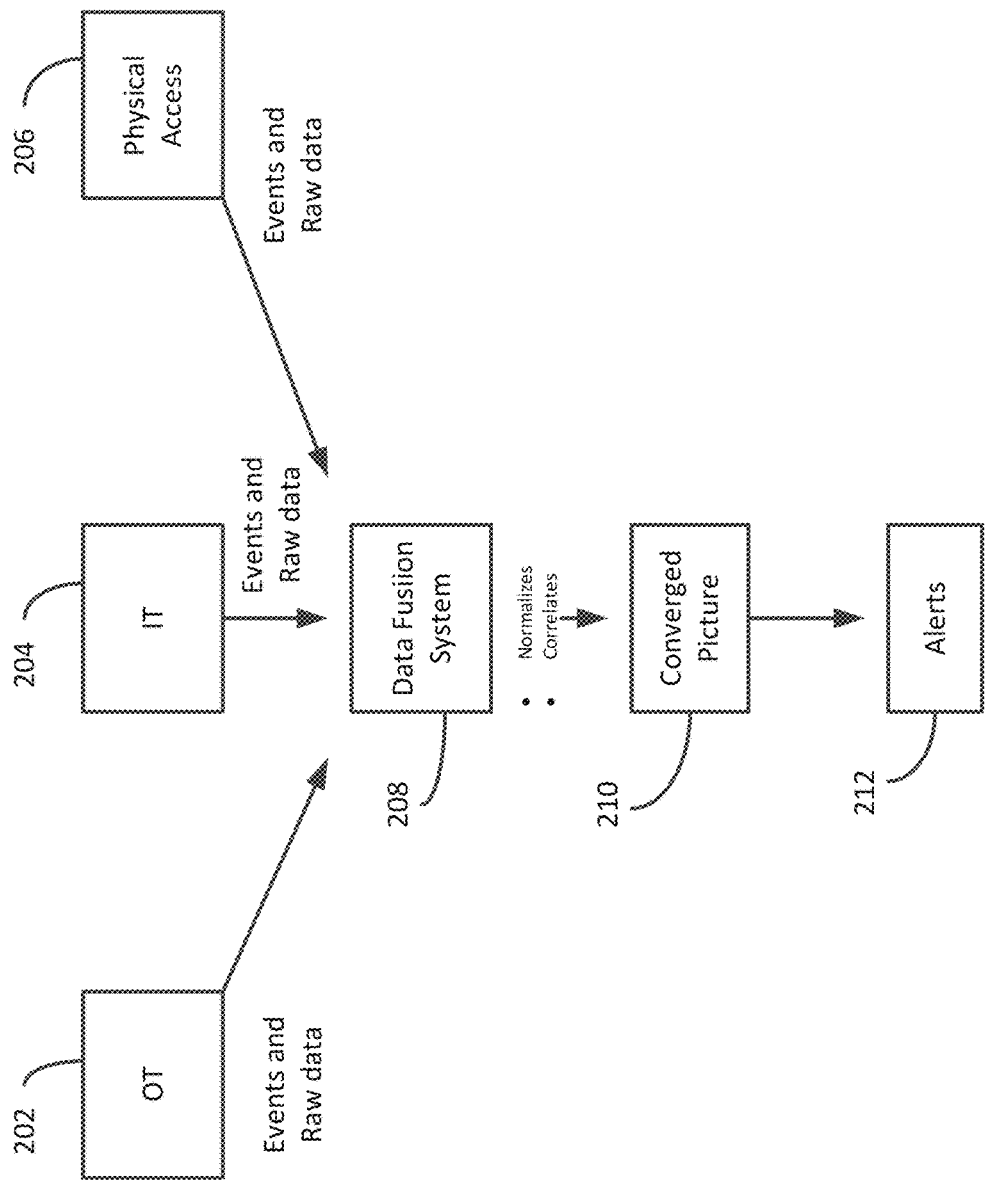
FIG. 2 is a diagram of a situation awareness process in accordance with an exemplary aspect of the disclosure.

FIG. 2 is a diagram of a situation awareness process in accordance with an exemplary aspect of the disclosure. In one or more embodiments, events and raw data from at least three main domains 202, 204, 206 may be merged, normalized, and correlated 208 into respective pictures resulting in a converged picture 210 in order to trigger alerts 212. Types of sensors and devices that provide data for the three domains in the case of electric power plants are listed in Table 1.

Table 1 of Types of Sensors and Devices for Electric Power Plants.

| Description |
| --- |
| Modular Distributed Event Recorder |
| Distribution Relay |
| Security Appliances |
| Feeder Protection Relay |
| Managed Ethernet Switch |
| Universal Relay T-60, Transformer Protection |
| Substation Automation & Cyber Security |
| Secure Remote Terminal Data |
| Console Server |
| Communication Processor |
| Programmable Automation Controller |
| Discrete Programmable Auto Controller |
| Software-Defined Network Switch |
| Reclosing Relay |
| Breaker Failure Relay |
| Phase and Ground Distance Relay |
| Real Time Automation Controller |
| Serial Port Server |
| Serial - Ethernet Security Gateways |
| Protection, Automation, and Control System |
| Protection, Automation, and Bay Control System |
| Universal Overcurrent Relay |
| Generation Protection Relay |

OT events and data 202. Within OT, a Process Network hosts supervisory control and data acquisition (SCADA) systems, which receive measurements and actions from the sensors, actuators, and other components that comprise the power plant hardware, or Field Network. The Process Network can maintain a summary of actual power plant state, and issue commands to a Field Network.

IT events and data 204. In one embodiment, a network traffic analyzer may be used to model IT. The analyzer tracks network traffic passing through a location, logging flows, source, destination, port, etc. The information it contains includes source IP (Internet protocol), addresses, destination IP addresses, packets in the flow, TCP/UCP (transmission control protocol/user datagram protocol) source and destination port numbers, IP protocol types, Internet Control Message Protocol (ICMP) usage, autonomous system (AS) number of sources, protocol entropy, and more.

Physical Access 206. Physical security limits access to locations and system assets to approved personnel. Physical security may include closed circuit television (CCTV) surveillance systems, burglar alarm systems, and card reader access control systems. Although many of these systems are independently monitored by security personnel and third-party entities, they may not be monitored continuously, nor do all incidents provoke timely investigation.

Data fusion 208 is performed to merge, normalize, and correlate events and raw data from the OT 202, IT 204, and physical access 206 domains to create a converged system picture 210 that may enable threat detection. Simultaneously analyzing information from the OT 202, IT 204, and physical access 206 domains of an industrial control system facility such as a power plant, provides insights to end users and system operators that normally would not be available when considering each system's behavior separately.

In one embodiment, the Joint Directors of Laboratories (JDL) model may be used as the fusion model. JDL supports the alignment, normalization, and timestamping of all ingested data on a consistent set of space-time coordinates. The JDL model may also be used to support data aggregation over time (e.g., of data packets into data windows) and development of state information (behavioral primitives) through extraction of features and behaviors from the fused data.

Figure 3:
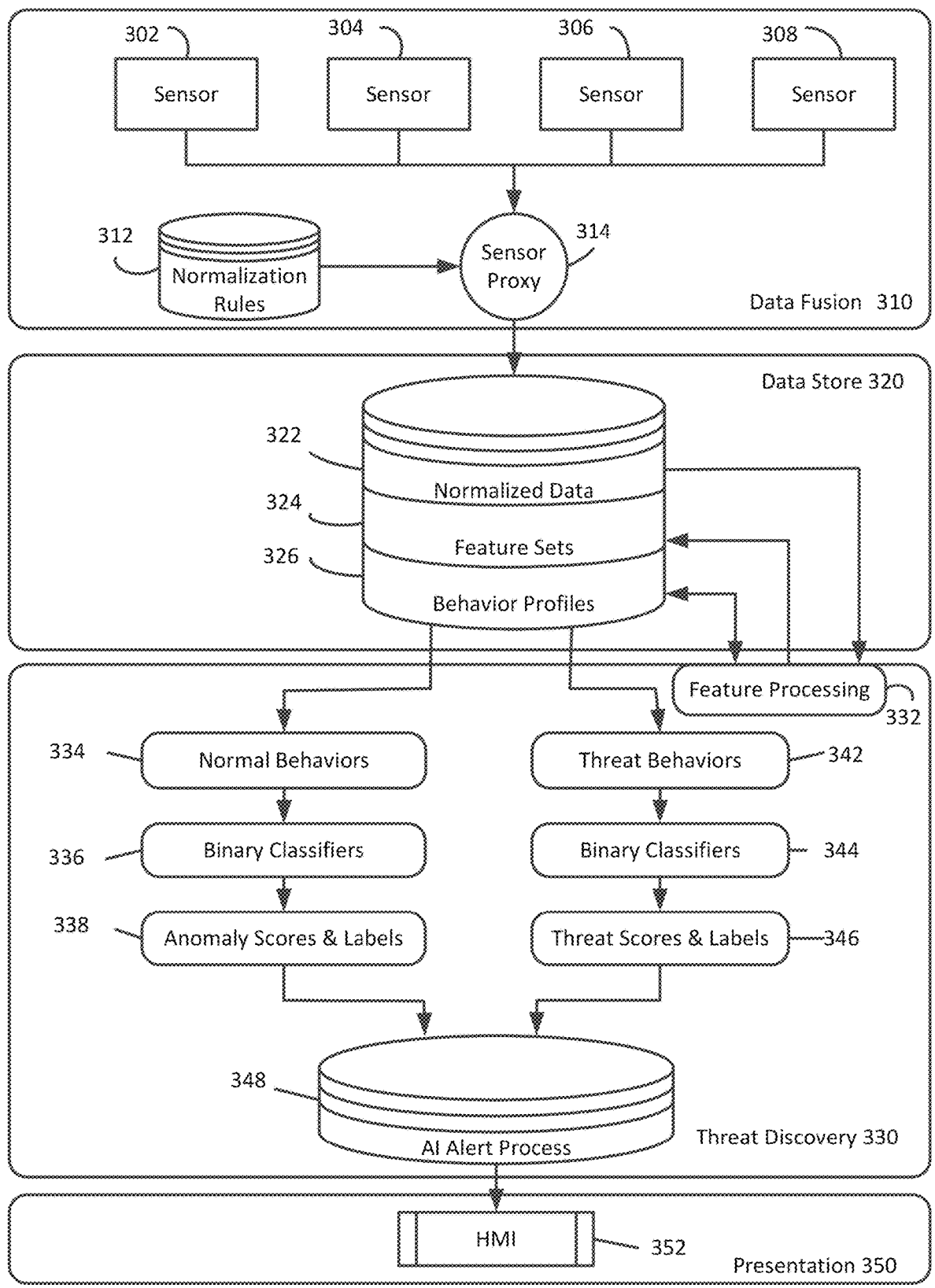
FIG. 3 is a high-level data flow diagram in accordance with an exemplary aspect of the disclosure.

FIG. 3 is a high-level data flow diagram in accordance with an exemplary aspect of the disclosure. The system architecture may include a separate presentation layer that provides the Human Machine Interface (HMI). The data flow separates processing into successive phases of Data Fusion 310 using data fusion circuitry, Data Store 320, Threat Detection 330 using threat detection circuitry, and Presentation 350 using presentation circuitry. The data flow may include multiple information domains in the Data Fusion layer 310. Organizing the data flow as separate successive phases/layers enables accomplishment of wide data scope, expandable processing bandwidth, isolation of software components, organization of system security, organization of data for archival and audit trails, and ease of information visualization.

Data Fusion Layer 310:

Sensors 302, 304, 306, 308: Detect raw data and events coming from combination of IT, OT and PA.

Sensor Proxy 314: Fuses all sensor inputs and converts the fused sensor inputs with normalization rules to standard formats and ranges, providing for consistent processing.

Normalization Rules 312: Aligns data using available calibrations, enumerations, units, mins and maxs for consistent formats and ranges.

Data Store Layer 320: Buffers normalized data 322, feature sets 324 and behavior profiles 326.

Threat Discovery Layer 330:

Feature Processing 332: Features are constructed from normalized data using behavior profiles. The profiles are stored templates of prescribed feature sets 324. Features that may be constructed may include those listed in Table 2.

TABLE 2

| OT and IT Targeted Features | |
| --- | --- |
| Supervisory Control and Data Acquisition/OT Network | IT network |
| Number of IP addresses | Port scatter |
| Number of packets with 0 window size | Source Data Transfer |
| Average interval between packets | Sink Data Transfer |
| Number of packets with 0 data length | Source Packets |
| Number of protocols | Sink Packets |
| Average window size | TCP, UDP, ICMP Bytes |
| Number of flag codes | TCP, UDP, ICMP Packets |
| Average data length | TCP and UDP Work Weights |
| Min/max packets per protocol | Packet Inter-arrival Time |

Behaviors: Behaviors (sets of features over some time period) are constructed from either expert knowledge of threat behavior components 342 or components from accumulated non-threat normal data 334. Threat signature components may be over a certain time period, such as hour, day, or week. Normal behaviors 334 are derived by Principal Component Analysis (PCA) or grouping by machine learning (SVM, cluster analysis).

Feature Processing 332: Once fused, the data are wide (many features) and tall (many records). Wide, tall datasets present a large potential number of derived features, but not all features are useful. In order to reduce the number of features to a subset that is effective for energy sector (i.e., electric power plants) threat detection analytics, the following techniques may be used.

Principal Component Analysis (PCA). PCA may be used to reduce the feature space to a lower dimensional space. It is an exploratory tool to that can uncover unknown trends in the data. Existing features can be transformed into combinations of the principal components. Reducing the number of features this way makes the analysis more tractable. However, PCA may reduce the interpretability of the features, which is an acknowledged trade-off for the improved feature reduction. The Human-Machine Interface (HMI) 352 alleviates this trade-off by providing clear contextual information in the user display.

Classifiers: Normal behaviors 334 may be scored to reflect the degree of anomaly 338 determined with a machine learning binary classifier 336 and threat behaviors 342 may be scored to reflect the likelihood of a threat 346 with a machine learning binary classifier 344. ML algorithms for the machine learning binary classifiers 336, 344 might include random forest or recursive neural network.

ML Classification and Regression Techniques.

Given historical data known to be either normal or labeled attack data, ML classifiers and regression techniques are trained to learn which features best predict whether the data is likely to be normal or attack. One type of ML classifier, Support Vector Machines (SVM) may be applied to focus on the aggregation of extracted features, operating on composed behaviors to train models to classify threats. The SVM breaks up the extracted features (feature space) into parts, partitioning them into disjoint subsets, allowing the situation awareness system 102 to handle the high dimensionality of the feature space produced from the sensor data. The subsets may have labels concerning the nature of the traffic within them, such as "normal", "spamming hosts", etc.

As an alternative to binary classification, the situation awareness system 102 may utilize a continuous-valued score between 0 and 1, where the value signifies the likelihood that the data represents an attack (0 signifying absolutely normal traffic, 1 signifying certain attack). To achieve this, the situation awareness system 102 may deploy regression trees which ingest real-time data and generate operator and watchstander alerts with varying degrees of severity. Regression trees have an advantage over some ML techniques in that they can provide a human-readable ruleset indicating how the output value was derived based on the inputs.

Awareness: The outputs of the behavior classifiers 338, 346 (scores and labels) are processed to provide human-interpretable input to the system human-machine interface (HMI 352).

Human-interpretable input to the HMI 352 can include sensor state data, sensor state prediction data, system data, system user data, and notification data.

Sensor state data: Sensor state data can include timestamp aligned data, and real-time state data associated with a system sensor or group of sensors. Sensor state data can be either reported by a sensor in a single information domain, or reported by a group of sensors in a single information domain, or reported by a group of sensors across multiple information domains, or derived data created by the situation awareness system 102.

Sensor state prediction data: Sensor state prediction data can include trend data, including data derived by curve-fitting to past sensor states and by extrapolation to sensor states in the future, associated with a sensor or groups of sensors. Sensor state prediction data can be either reported by a sensor in a single information domain, or reported by a group of sensors in a single information domain, or reported by a group of sensors across multiple information domains, or derived data created by the monitored system, or derived data created by the situation awareness system 102.

System data: System data can include any data visible to the situation awareness system 102 in the industrial control system's information domains, including the external domain, that is not an output of a system sensor. Derived data produced by a monitored system, for instance, or system notifications produced by the monitored system, are examples of system data the situation awareness system 102 can ingest, and to which it may add situation awareness context for presentation to a user.

System user data: System user data can include any data visible to the situation awareness system 102 specific to the inputs of users of the monitored system, that users put into the situation awareness system 102 itself, or that the situation awareness system 102 can derive from the observed behavior of user data entry. System user data may include free text shift notes, user-entered explanations of past or future system activity, typical login and logout times for a given user, the characterization of a given situation awareness system 102 notification as an incident or not, the timestamps associated with sending a notification to another situation awareness system 102 user.

Notification data: Notification data can include event, alert, and incident data which associate with sensor state data, sensor state prediction data, system data, and system user data, and which are presented to the user to provide additional situation awareness context. Notification data are created by the situation awareness system 102, and include both derived data created by the situation awareness system 102 and the previously described data types in the event where any sensor state, sensor state prediction, system data, or system user data is presented in a notification context. The situation awareness system 102 applies the notification context as a wrapper on the system-generated data to produce notification data.

Figure 4:
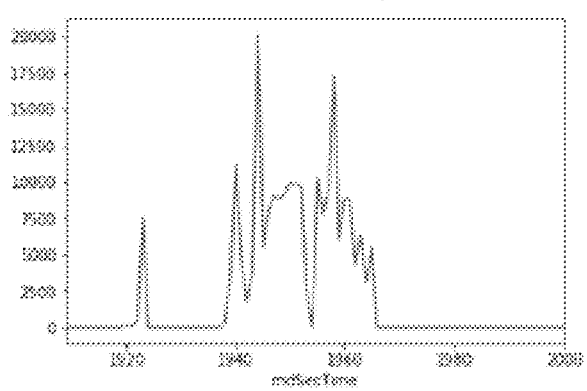
FIG. 4 illustrates exemplary feature extraction in accordance with an exemplary aspect of the disclosure.

FIG. 4 illustrates exemplary feature extraction in accordance with an exemplary aspect of the disclosure. After normalizing 312 the sensor data and extracting features 332 from the resultant dataset, the situation awareness system 102 generates behaviors 342, which are sets of features exhibited over some time period, based on known threat signatures defined by cybersecurity and system domain experts, and identification by ML classifiers 344. This threat detection technique constitutes the threat signature-based portion of the system. Specific examples of feature extraction and engineering results created from a set of network flows at the beginning of an analysis are illustrated in FIG. 4.

In addition to signature processing, the situation awareness system 102 may pursue an anomaly-based detection process 334, 336, 338. The normal historical traffic are characterized with behaviors by processing the outputs of the binary classifier 336 with neural networks. In one embodiment, the neural networks are recurrent neural networks, which are adept at handling streaming data. In determining anomaly scores 338, incoming traffic may be compared with this streaming data using a distance metric; in 338, data traffic that varies from an established baseline may generate an anomaly score proportional to its difference from the baseline (i.e., wide variance from the baseline may produce a high anomaly score). An example distance metric is the difference between the average value of some network quantity like packet length for incoming and normal traffic.

In addition, by using more complex distance metrics, one can report where the average of such a quantity for incoming traffic lies within the distribution of that quantity for normal traffic, e.g. within one standard deviation of the mean, etc. Since such quantities evolve in time, the system can use exponential moving averages of the quantity over time, placing more emphasis on more recent measurements. More than one network quantity can be combined in a vector and some of the same kinds of distances may be used, among them an L2 or Euclidean norm to handle real-valued quantities. A clustering approach such as k-means or k-nearest neighbors may be used for outlier detection, where sources with data falling outside clusters of normal traffic could be identified as potentially anomalous.

Situation Assessment in Threat Discovery Layer 330. Situation assessment processing may consist of multiple correlation models, including signature 346 and anomaly-based 338 subsystems, working in parallel across the domains of OT, IT, and physical access. The outputs of these models, which comprise a human-readable set of weighted rules, may be combined to provide a final correlation to be used by a decision maker module 348, which ultimately generates end user alerts, and their associated confidence indices. Each model does not need to perform optimally under all use-cases. In one or more embodiments, an ensemble approach may form a weighted combination of the individual model outputs based on the quality of each under the given inputs. Neural networks may be used to process outputs from SVM binary classifiers 336, 344. An output of a neural network can be classified into various sets depending on its values for measured quantities. These sets can have meaningful labels signifying level of threat. The output's membership may not be hard and fast depending on its values. For example, an output can be considered to be 70% threatening.

Furthermore, set classifications such as these can be fused by the various models. Final alert determination can be issued depending on an accumulated output from a subset of the model ensemble. In one or more embodiments, the ML can be used in training the system to find optimal rules and weights that span the process from measurement inputs to alert notification.

Figure 5A:
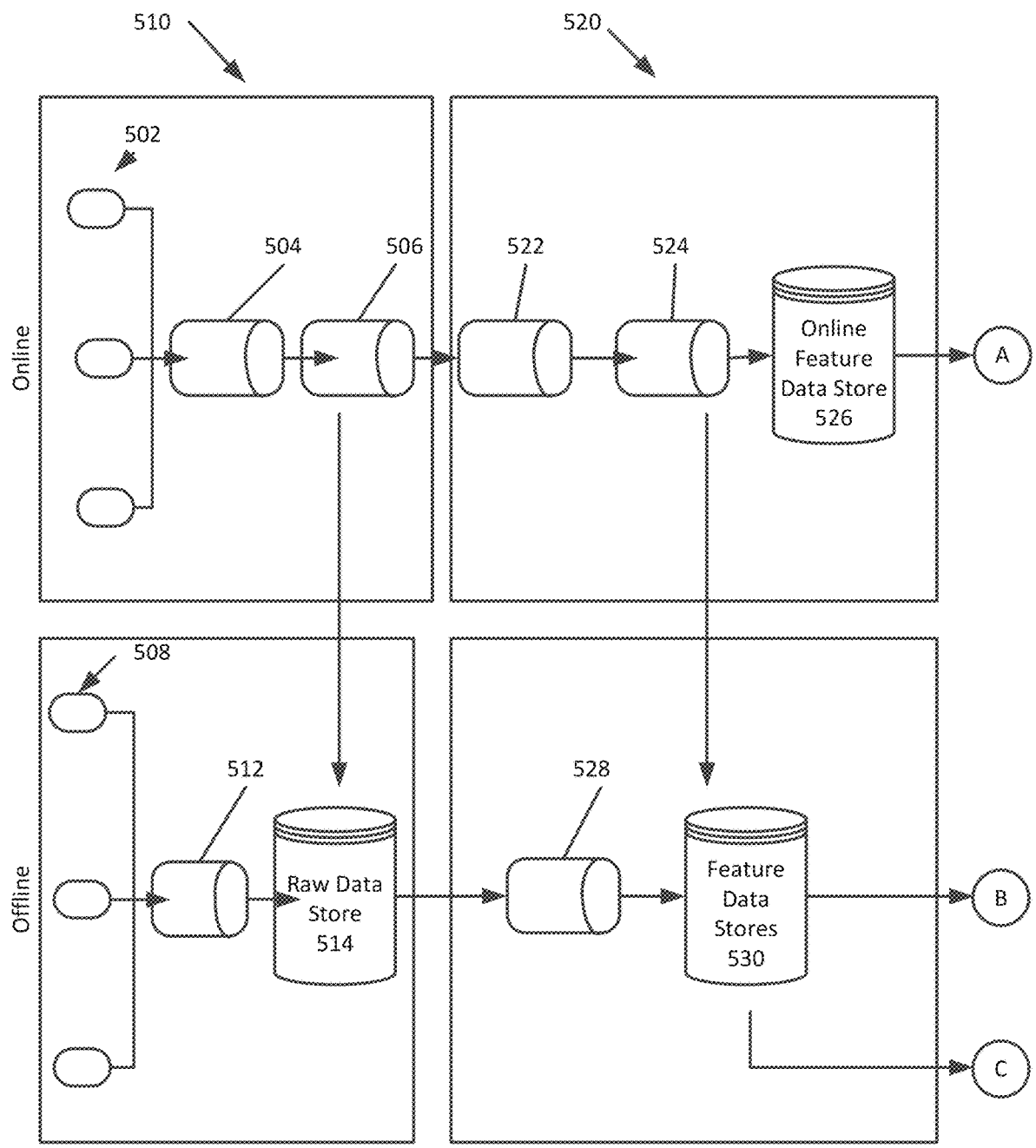
FIGS. 5A, 5B, 5C are a data flow diagram of situation awareness system development in accordance with an exemplary aspect of the disclosure.
Figure 5B:
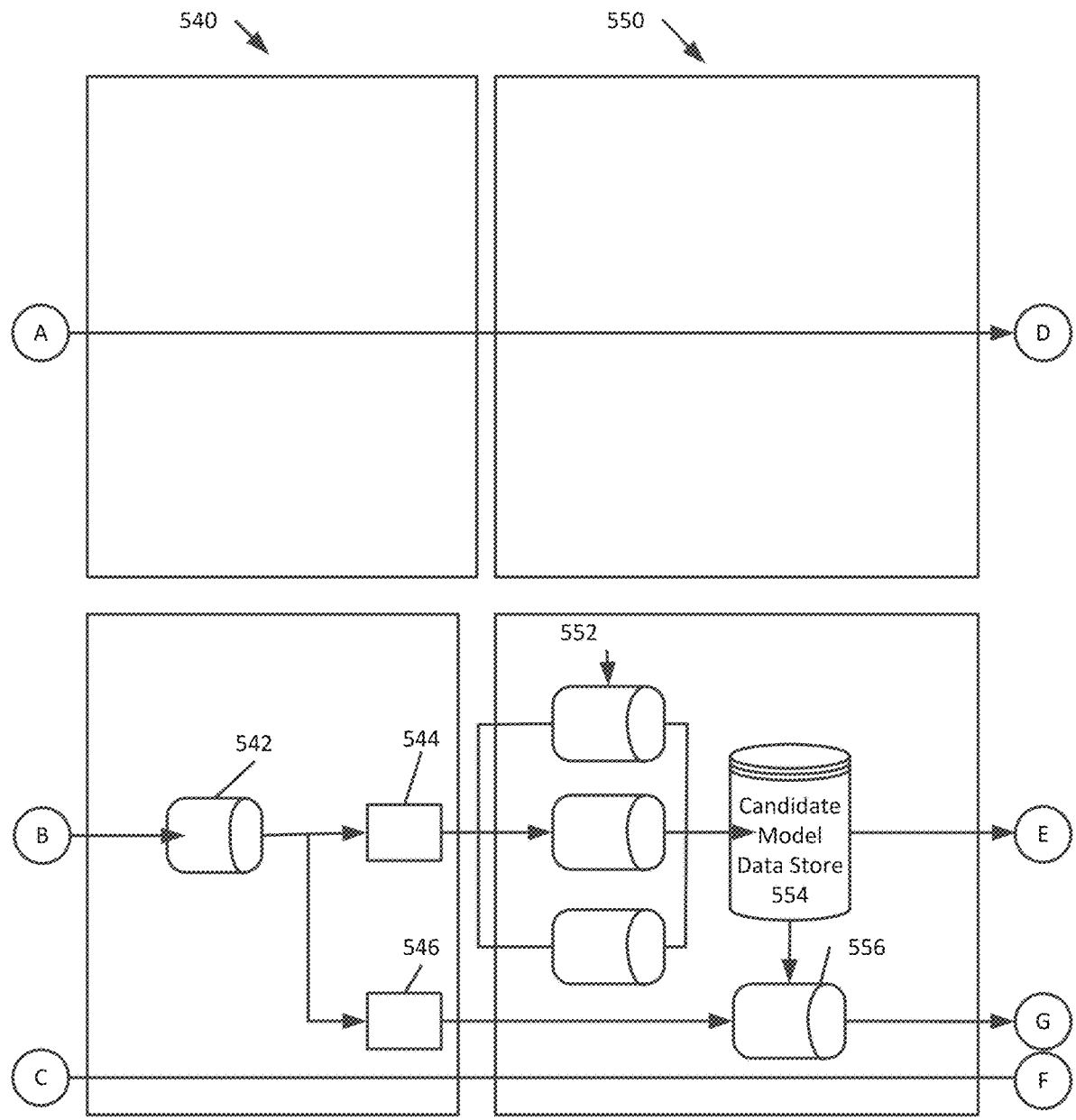
Figure 5C:
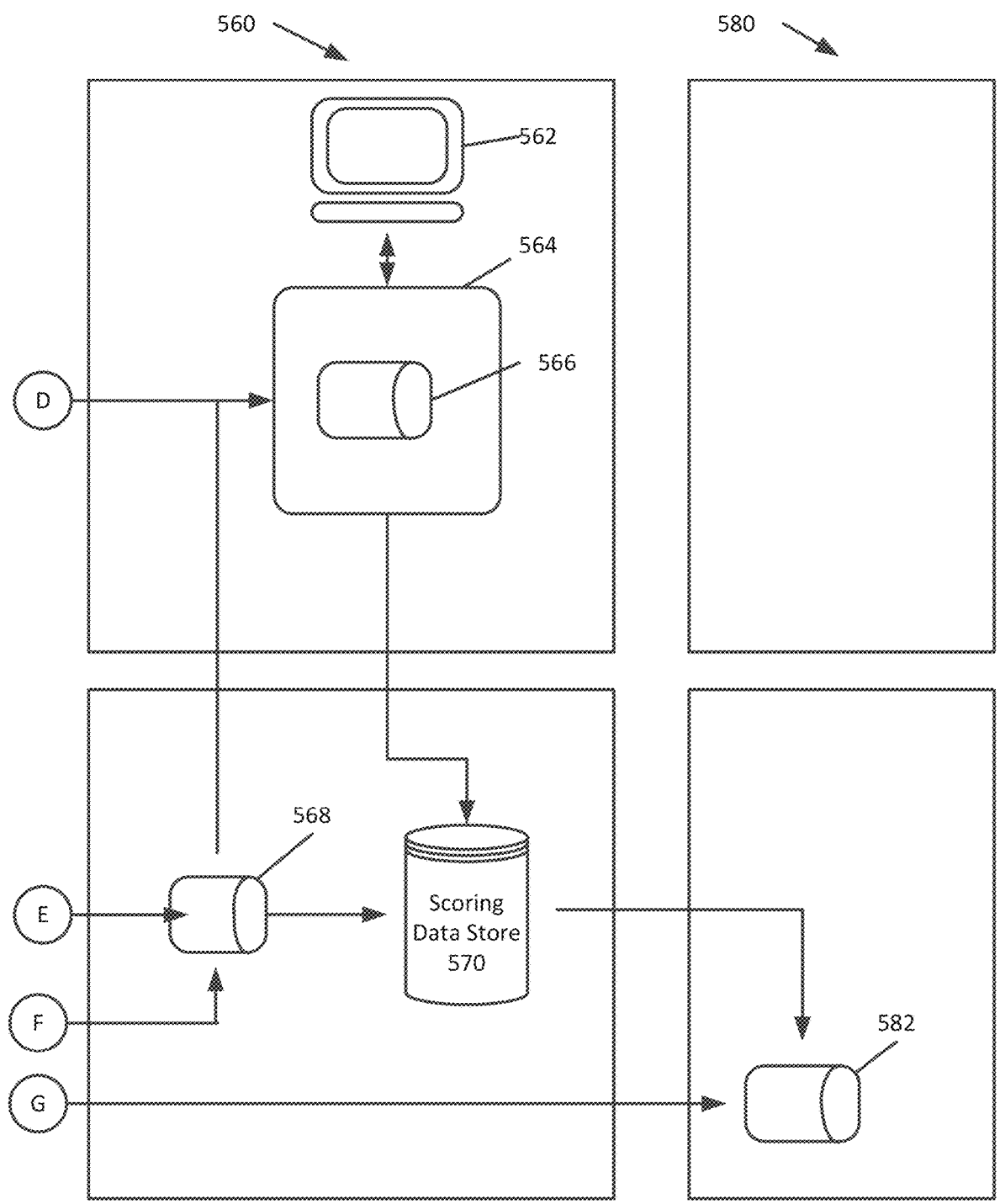

FIGS. 5A, 5B, 5C are a diagram of a data flow pipeline of situation awareness system development in accordance with an exemplary aspect of the disclosure.

The diagram in FIGS. 5A, 5B, 5C depicts a set of components which may be used in development of the data flow processing of FIG. 3. The data flow pipeline may involve a sequence of operations by circuitry including data ingestion circuitry 510, data preparation circuitry 520, data segregation circuitry 540, model training circuitry 550, model scoring circuitry 560, and performance monitoring circuitry 580. Some circuitry may perform operations offline and some circuitry may perform operations online. In the online pipeline, data from various sensor sources 502 and input by a streaming service 504 may be stored in a buffer 506. Data from the buffer 506 is fed to a streaming service 522 in the data preparation circuitry, then to a data preparation service 524 and stored as resulting features in feature data store 526.

In the offline pipeline, the data from the various sensor sources 508 is handled by a bulk ingestion service 512 and stored in a raw data store 514. The raw data store 514 may also receive streamed data from the online ingestion service 506. In the data preparation circuitry 520, a data preparation service 528 may process data from the raw data store 514 and store the processed data in a feature data store 530. The feature data store 530 may also receive processed data from the online data preparation service 524.

In the data segregation circuitry 540, a data segregation component 542 may format the data for a machine learning model. The data segregation circuitry 540 may split the dataset from each data pipeline into a training set and test/validation set. The test/validation set provides an unbiased estimate of the accuracy of the machine learning model trained on the training set. The output of the data segregation component 542 may be provided as training data vectors 544, or testing/validation data vectors 546.

Cross correlation of multiple information domains may be accomplished in one of two ways. The first way may take place in the data preparation service where data is pulled from two or more different information domains and fused to create an intermediate data object, comprising information from the different domains, and stored in the Feature Data Store 324. Once this is created a ML model may be trained that provides cross correlation ML.

The second way occurs in the model training service which joins the ML models for two or more different information domains to create a distinct trainable ML model for each of the domains. In one or more embodiments, the Model Training circuitry 550 may include three model instances 552 that may be trained using the training data vectors 544. It should be understood that there may be more than three information domains and respective model instances. In other words, there may be N information domains and N model instances 552. The situation awareness system 102 allows for different models and data preparation transformations in each of the information domains it handles. In addition, each information domain's ML engine 552 may produce independent results, and then the situation awareness system 102 performs correlation (e.g., cross correlation) across those domain results to find and analyze any cross-domain anomalies. The cross-domain anomalies can indicate a sign of an advanced threat.

Further, in the Model Training circuitry 550, candidate machine learning models may be stored in a candidate model training store 554. A model evaluation service 556 may be used to evaluate the candidate machine learning models.

In a Model Scoring circuitry 560, a best machine learning model may be selected and provided as a deployed machine learning model 566 in a deployed service 564. The deployed service 564 may be accessed by one or more client computer devices 562. Results of the deployed machine learning model 566 are provided to a scoring data store 570. Scoring data may include known evaluation parameters including one or more of accuracy, sensitivity, specificity.

In Performance Monitoring circuitry 580, the score data 570 and results of model evaluation service 556 are provided to a performance monitoring service 582 which judges performance of the deployed machine learning model 566. Performance results from the performance monitoring service 582 may be used in making adjustments to or replacing the deployed machine learning model 566.

Figure 6:
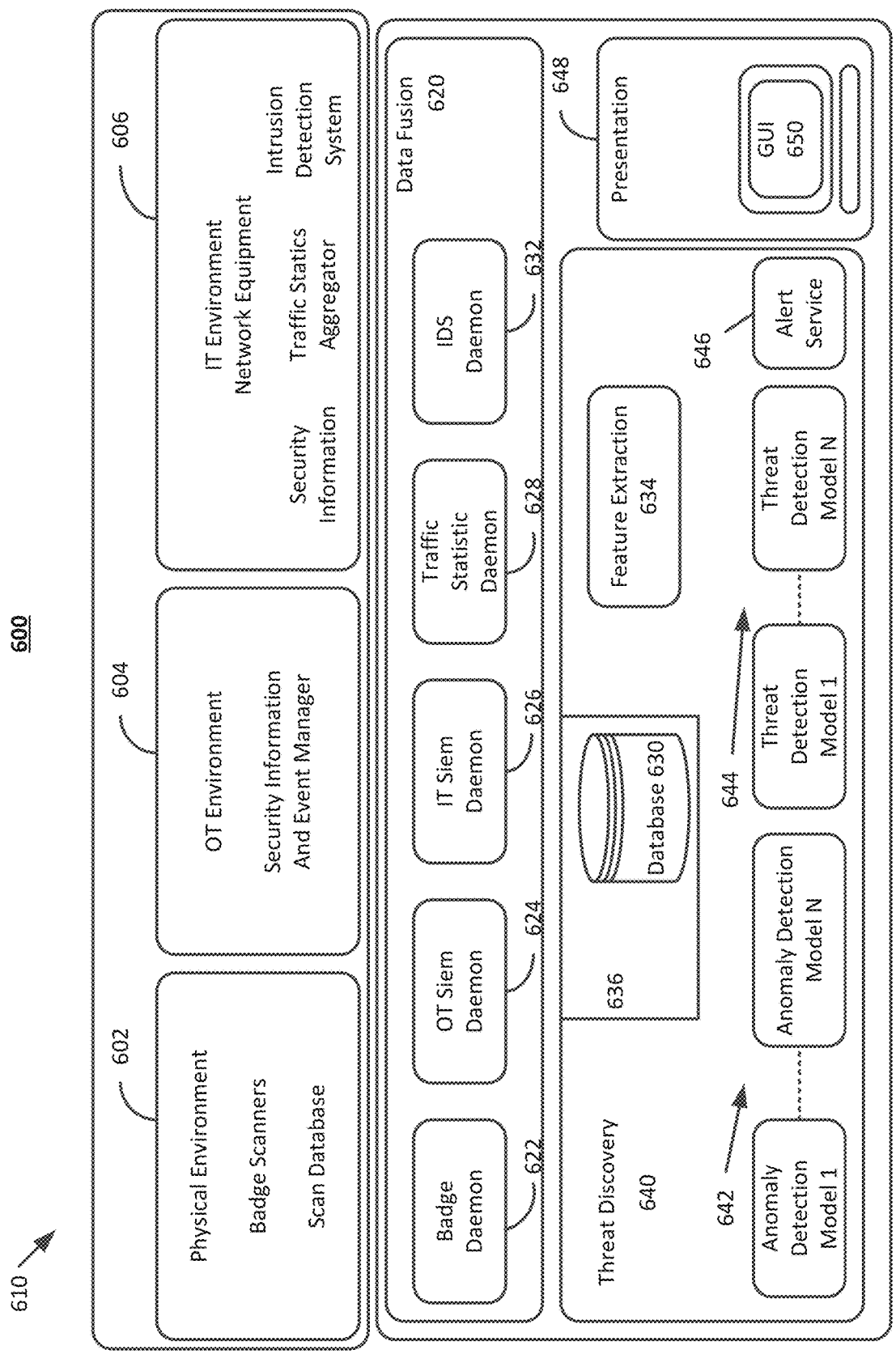
FIG. 6 is a schematic view of a software system architecture in accordance with an exemplary aspect of the disclosure.

FIG. 6 is a schematic view of a software system architecture in accordance with an exemplary aspect of the disclosure. A software system architecture 600 has been developed based upon the data flow, and identified features for extraction and model training approaches. Key components of the situation awareness software system architecture 600 include a data fusion layer 620; a central database 630 and database abstraction layer 636; a threat discovery layer 640 that includes feature extraction 634, behavior detection 642, and alerting 646; and a presentation layer 648 comprising the HMI element 650.

Data Fusion Layer 620. The data fusion layer 620 may comprise a set of sensor daemon services, each of which may ingest industrial control system and external data 610 from a particular sensor type 602, 604, 606, normalize it, and insert the data into the database 630. Because the situation awareness system 102 supports the communications protocol and data format for each sensor type, there is a natural mapping from each sensor type to a run-time instance of the sensor daemon.

The situation awareness system 102 may integrate with the reporting mechanisms of existing industrial control system facilities, but may not dictate those mechanisms. Therefore, a generic sensor daemon may support both push and pull retrieval mechanisms in order to passively listen for data or actively query for it as needed. Each run-time instance of the sensor daemon may then use the retrieval mechanism required by the sensor type it handles. To prevent spoofing, the communication protocol chosen for each sensor type may require support for authentication. The generic design of each daemon includes a security layer, a query logic layer, and a normalization layer. Each run-time instance of the sensor daemon may configure these layers in order to process data from the sensor type it handles.

The security layer may securely manage all communications between the daemon and its coupled sensors. The security layer may implement Transport Layer Security (TLS) protocol to establish and maintain an authenticated, private channel through which sensor data can flow.

The query logic layer may manage the retrieval and unpacking of raw sensor data. In the case where a sensor is pushing data to the daemon, it may use the format specified by the sensor type to unpack the data before forwarding it to the normalization layer. In the case where the daemon is pulling data from a sensor, the query logic layer may maintain a schedule for persistent requests for new data from that sensor, unpack the data upon its arrival, and forward it to the normalization layer.

The normalization layer of each daemon instance may apply customized conversion logic to the raw sensor data it retrieves so that the data can be inserted into the database in normalized, consistent form. Converting raw data into normalized form can be computationally expensive; therefore, this conversion may occur once for each retrieved datum, and the normalization layer may store the converted data in the database. The rest of the situation awareness system 102, may then process the normalized data without further run-time conversion of the raw, native data formats.

In one or more embodiments, the data fusion layer 620 may also perform data fusion of the sensor data from the sensor daemons. The data fusion layer 620 may perform alignment, normalization, and timestamping of all ingested data on a consistent set of space-time coordinates and store the fused data in the database 630.

Database Abstraction Layer 636. The database abstraction layer 636 may be a subprocess of the situation awareness system 102 that listens for database transaction requests from services in the data fusion, threat discovery, and presentation layers, and then executes those transactions on behalf of those services. The process associated with the database abstraction layer 636 may be solely responsible for interacting with the database itself and enforcing database security mechanisms. This component design ensures the security, performance, concurrency support, and scalability of the database. The database abstraction layer 636 encapsulates both relational and NoSQL databases and may handle all database-related transactions. The information is stored in the database to be used in various components and allow the database to be transparent.

Database 630. The database 630 may be the central hub for the situation awareness system 102, serving as both a permanent data storage repository for services and the secure communications output channel for behavior detection modules to the alert service. The database design may include normalized sensor data, feature extracted data, behavior module output data, and a log of historical alerts.

The normalized physical, OT, and IT data portions of the database 630 may consist of the normalized sensor data from the sensor types 602, 604, 606. The feature extracted data portion of the database may consist of normalized sensor data transformed for ingestion into behavior detection models for further processing. The feature extraction transformations may be applied once or more than once and the transformed results may be stored. The anomaly and threat detection components may use the database 630 as a secure communications channel to provide their output data to the alert service. The database 630 may contain an alert log to allow for historical lookups through the user interface 650.

Threat Discovery 640. The threat discovery layer 640 may include a set of feature extraction services 634 and a set of behavior detection services 642, 644. Feature extraction processing 634 may apply transformations to normalized data that minimize the data's dimensionality while enhancing predictive power (maximizing signal relative to noise). Behavior detection processing 642, 644 may use the feature-extracted data to generate system behaviors that characterize sensor outputs across multiple time-scales, to classify those behaviors and generate alerts.

Feature Extraction 634. Each feature extraction service 634 may run in one of two modes: extraction or transformation. During extraction mode, the feature extraction service may schedule the internal retrieval of normalized sensor data from the database and specify the transformation to apply to that data. During transformation mode, the service may retrieve the specified normalized data from the database on the scheduled update cycle and then apply the specified transformations. After transformation, the feature extraction service 634 may insert the data to the feature set portion of the database 630 in its new form, making it available to the behavior detection services 642, 644.

The feature set transformations may be determined both manually, using domain knowledge provided by system domain experts, and dynamically using principal component analysis. The feature set vector outputs of this processing, grouped over varying time periods, may provide inputs for behavior detection processing 642, 644 to analyze for the presence of threats.

Behavior Detection 642, 644. Each behavior detection service 642, 644 trains, stores, and deploys a ML model. The detectable behaviors are divided into two categories: anomaly detection 642 and threat detection 644. An anomaly detection behavior service 642 may detect significant divergence from a trained baseline distribution. Any such divergence may or may not be associated with a threat. A threat detection behavior service 644 may detect behavior consistent with a known threat profile.

Each behavior detection service 642, 644 may encapsulate a supervised machine learning model or an unsupervised machine learning model, and each may support both a training and deployment mode. To train a supervised machine learning model, the service may use labeled data sets in order to build a classifier. To train an unsupervised machine learning model, the service may establish a baseline against which new data can be compared.

During deployment mode, each behavior detection service 642, 644 may draw either normalized and/or feature extracted data from the database. Each of these services may run continuously, poll for changes to its input data, and detect anomalies or threats when the data have changed. Some of these services may run more frequently than others (e.g., a service monitoring for a threat over a wider time window may run less frequently than a service monitoring for a threat over a narrow time window). The update cycles of these services may be load balanced across time so that the ability to detect threats and anomalies is maximized against the availability of processor and database resources.

When a behavior detection service determines a positive detection, it may output an alert data item into the behavior detection portion of the database. The alert item may contain the information that is consumed by the alert service and ultimately displayed to the end user.

Alert Service 646. The alert service 646 may convert outputs from the behavior detection models 642, 644 to end user alerts provided on the HMI 650. The alert service 646 may continuously poll the database in order to obtain the latest alert data written by the behavior detection services. In order to keep this transport mechanism simple and secure, the alert data may be transferred through the database 630 using its secure communication protocol, instead of through an additional alert-specific interface.

In addition to conveying anomaly detection and threat detection data to the user, the alert service 646 may apply any threat discovery logic that depends on the state of the system as a whole, or that depends on the status of the other models. Behavior detection services 642, 644 may operate independently of one another, and the alert service component 646 may use their outputs as inputs to its system-wide threat discovery logic, as determined by system domain experts. Finally, the alert service 646 may update and maintain a log of all alerts in the database 630.

Figure 7:
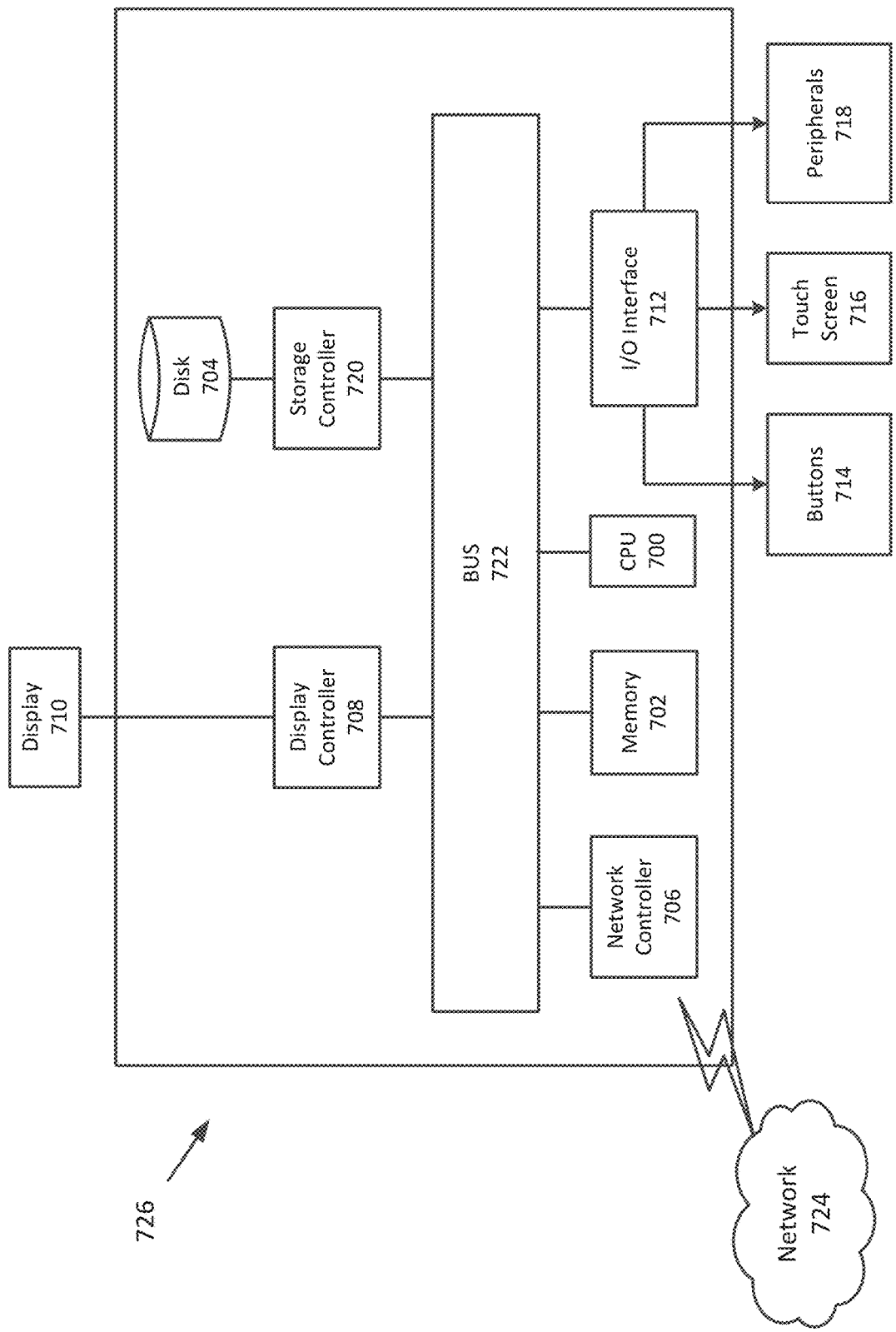
FIG. 7 is a block diagram of an exemplary computer system in accordance with an exemplary aspect of the disclosure.

FIG. 7 is a block diagram of an exemplary computer system in accordance with an exemplary aspect of the disclosure.

In one implementation, the functions and processes of the software system architecture of FIG. 6 may be implemented by a computer 726. Next, a hardware description of the computer 726 according to exemplary embodiments is described with reference to FIG. 7. In FIG. 7, the computer 726 includes a CPU 700 which performs the processes described herein. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 726 communicates, such as a server or computer.

Further, the functions and processes may be provided as a utility application, background daemon, or component of an operating system, or combination thereof, executing in conjunction with CPU 700 and an operating system such as Microsoft® Windows®, UNIX®, Oracle® Solaris, LINUX®, Apple macOS® and other systems known to those skilled in the art.

In order to achieve the computer 726, the hardware elements may be realized by various circuitry elements, known to those skilled in the art. For example, CPU 700 may be a Xenon® or Core® processor from Intel Corporation of America or an EPYC™ or Ryzen™ processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computer 726 in FIG. 7 also includes a network controller 706, such as an Intel Ethernet PRO network interface card from Intel Corporation of America, for interfacing with network 724. As can be appreciated, the network 724 can be a public network, such as the Internet, or a private network such as LAN or WAN network, or any combination thereof and can also include PSTN or ISDN sub-networks. The network 724 can also be wired, such as an Ethernet network, or can be wireless such as a cellular network including EDGE, 3G, 4G, or 5G wireless cellular systems. The wireless network can also be WiFi®, Bluetooth®, or any other wireless form of communication that is known.

The computer 726 further includes a display controller 708, such as a NVIDIA® GeForce® GTX or Quadro® graphics adaptor from NVIDIA Corporation of America for interfacing with display 710, such as a Hewlett Packard® HPL2445w LCD monitor. A general purpose I/O interface 712 interfaces with a keyboard and/or mouse 714 as well as an optional touch screen panel 716 on or separate from display 710. General purpose I/O interface also connects to a variety of peripherals 718 including printers and scanners, such as an OfficeJet® or DeskJet® from Hewlett Packard®.

The general purpose storage controller 720 connects the storage medium disk 704 with communication bus 722, which may be an ISA, EISA, VESA, PCI, SATA, SAS, or similar, for interconnecting all of the components of the computer 726. A description of the general features and functionality of the display 710, keyboard and/or mouse 714, as well as the display controller 708, storage controller 720, network controller 706, and general purpose I/O interface 712 is omitted herein for brevity as these features are known.

Figure 8:
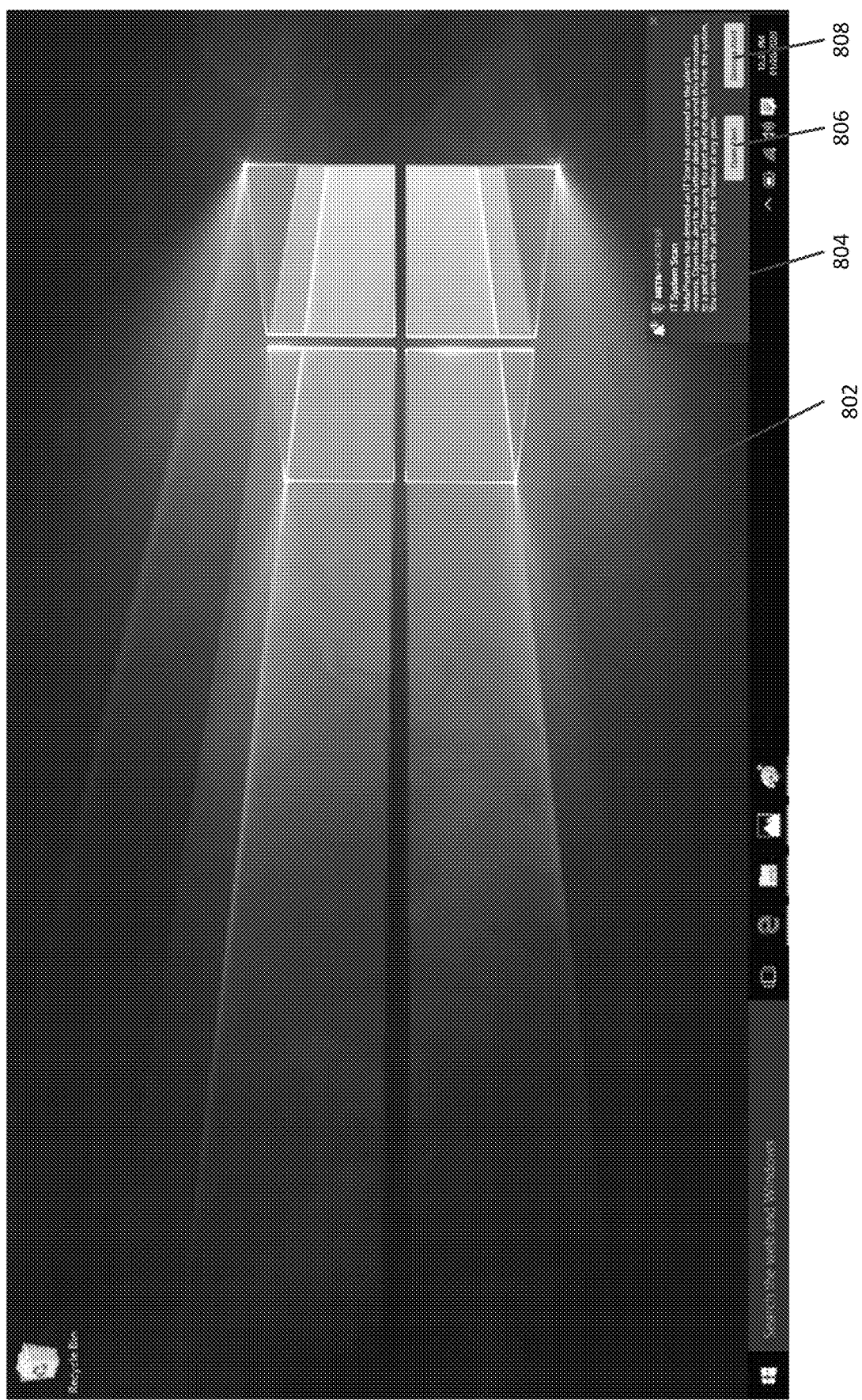
FIG. 8 is an exemplary display window with an alert notification in accordance with an exemplary aspect of the disclosure.

FIG. 8 is an exemplary display window with an alert notification in accordance with an exemplary aspect of the disclosure. In one or more embodiments, an initial desktop screen 802 may be displayed for an operating system, such as Windows. Upon detection of a possible threat, a pop-up notification 804 may be displayed. The pop-up notification may include a message that a possible threat has been detected with a function of viewing more information about the alert 806, or dismissing the message 808. Clicking on the "Open Alert" button 806 launches a home page.

Figure 9:
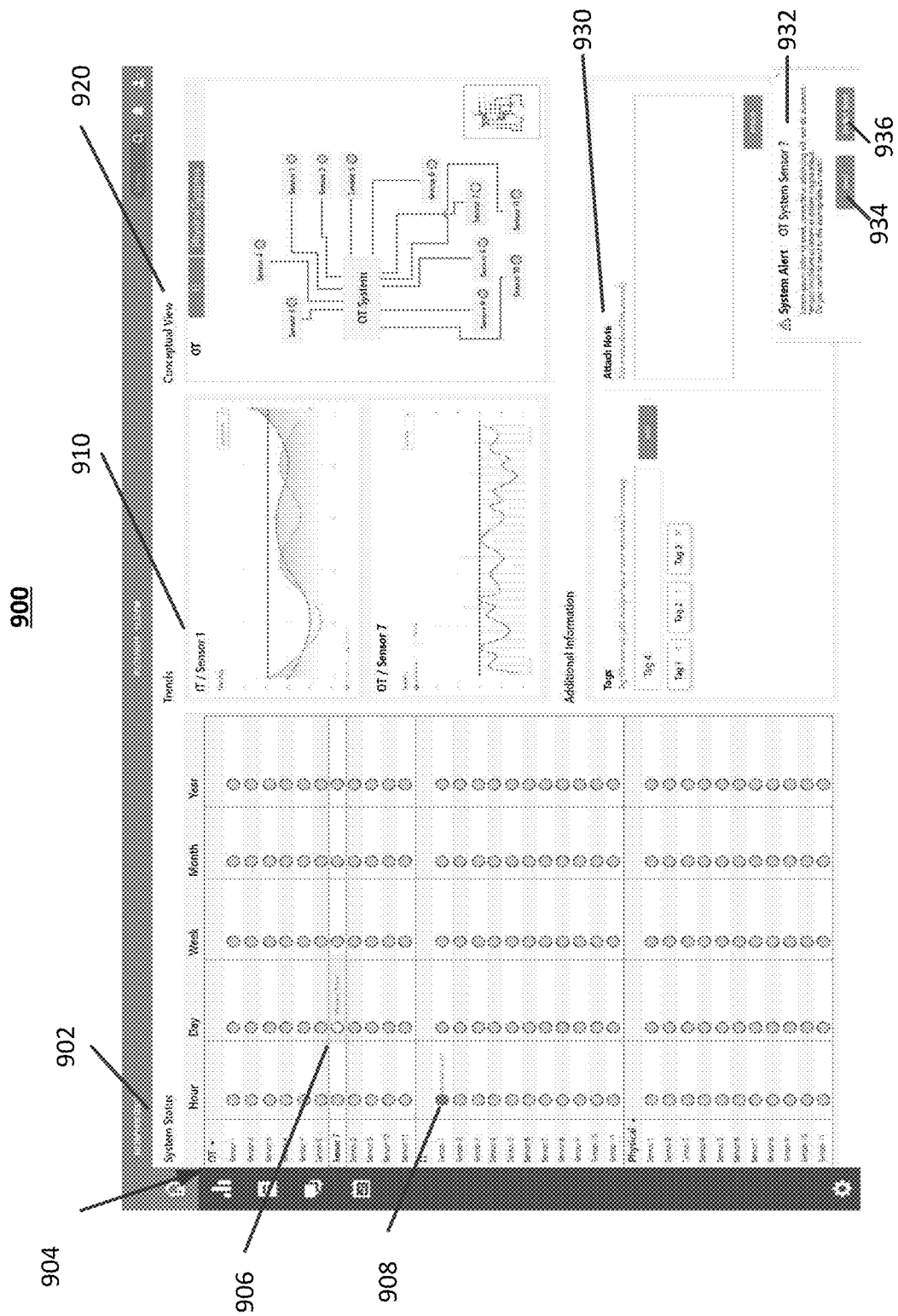
FIG. 9 is an exemplary display window for a home page which provides information related to an alert in accordance with an exemplary aspect of the disclosure.

FIG. 9 is an exemplary display window for a home page which provides information related to an alert in accordance with an exemplary aspect of the disclosure. The home page 900 for an alert may show a system status 902, trends 910 for items in the system status 902, a conceptual view 920, and a message field 930. In one embodiment, the system status 902 may show a list of sensors and a status indication for those sensors associated with the alert. The status information may indicate a period of time that the sensor exhibited an anomaly behavior. In the exemplary display, an anomaly was exhibited in OT sensor 7 in a day 906, and an anomaly was exhibited in IT sensor 1 in an hour 908. The trends 910 may show a graph of the effected sensors over the respective time period. The conceptual view 920 may display a system diagram of all sensors. The message field 930 may be used to enter a message for the anomaly associated with a sensor, e.g., sensor 7. Instructions 932 may be provided for actions that may be taken based on the anomaly. The instructions 932 may provide a function of sending 934 a message to other appropriate contacts, or not to send 936.

Figure 10:
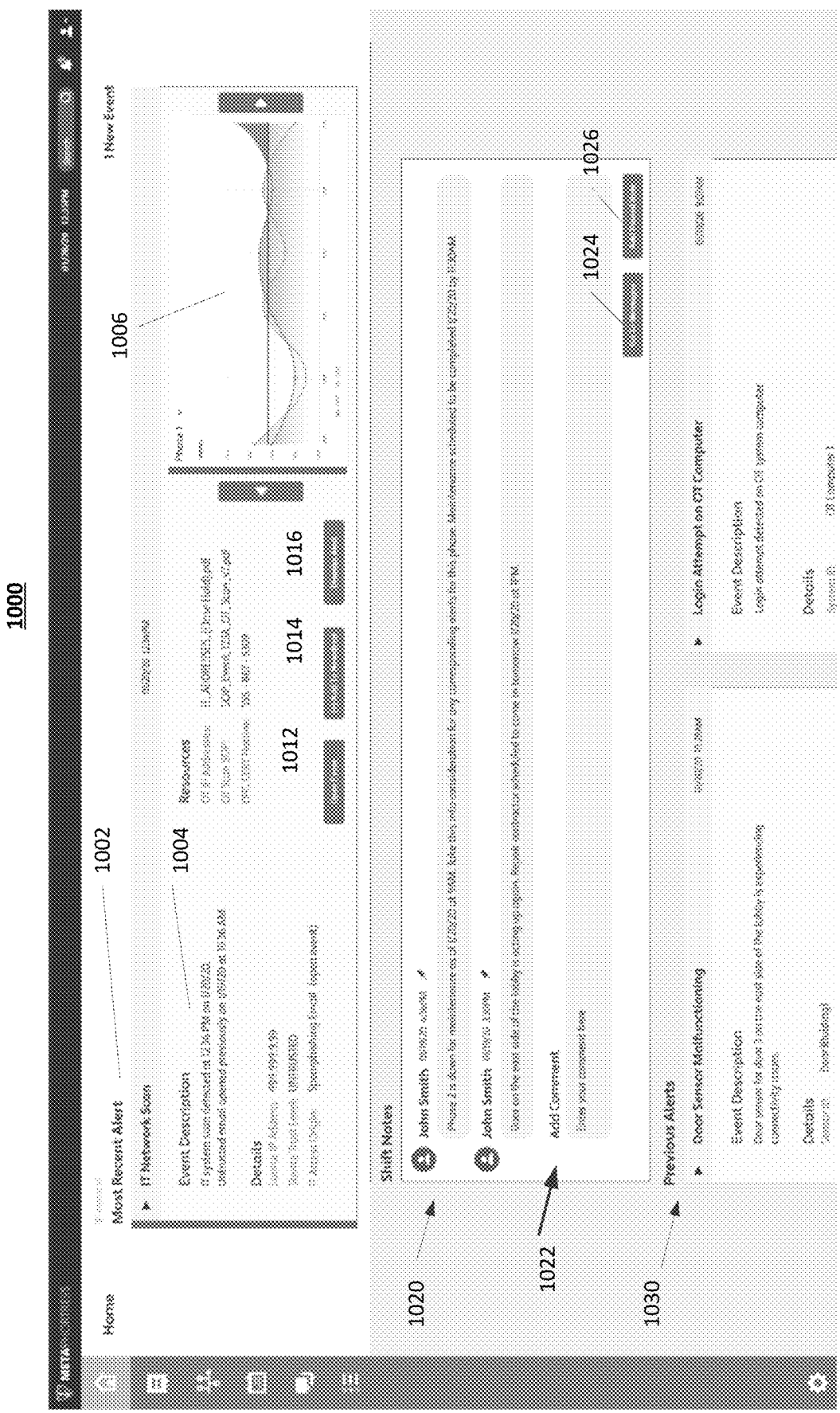
FIG. 10 is an exemplary display window for an alternative home page providing summary information of a most recent alert in accordance with an exemplary aspect of the disclosure.

FIG. 10 is an exemplary display window for an alternative home page in accordance with an exemplary aspect of the disclosure. The home screen 1000 is provided to focus on an alert. In one embodiment, the alternative home screen 1000 may include a summary section of a most recent alert 1002. In addition, the home screen 1000 may include a comments section 1020 and a list of previous alerts 1030. The most recent alert 1002 may include a brief description 1004 of the alert event. The home screen 1000 may include a function 1012 to open an event to obtain more details of the alert event, a function 1014 to add the alert event to a newsfeed, and a function 1016 to dismiss the alert. The comments section 1020 may include a function 1022 to add a comment, as well as a function 1024 to go to a display window for messages, and a function 1026 to add a pinned note.

Figure 11:
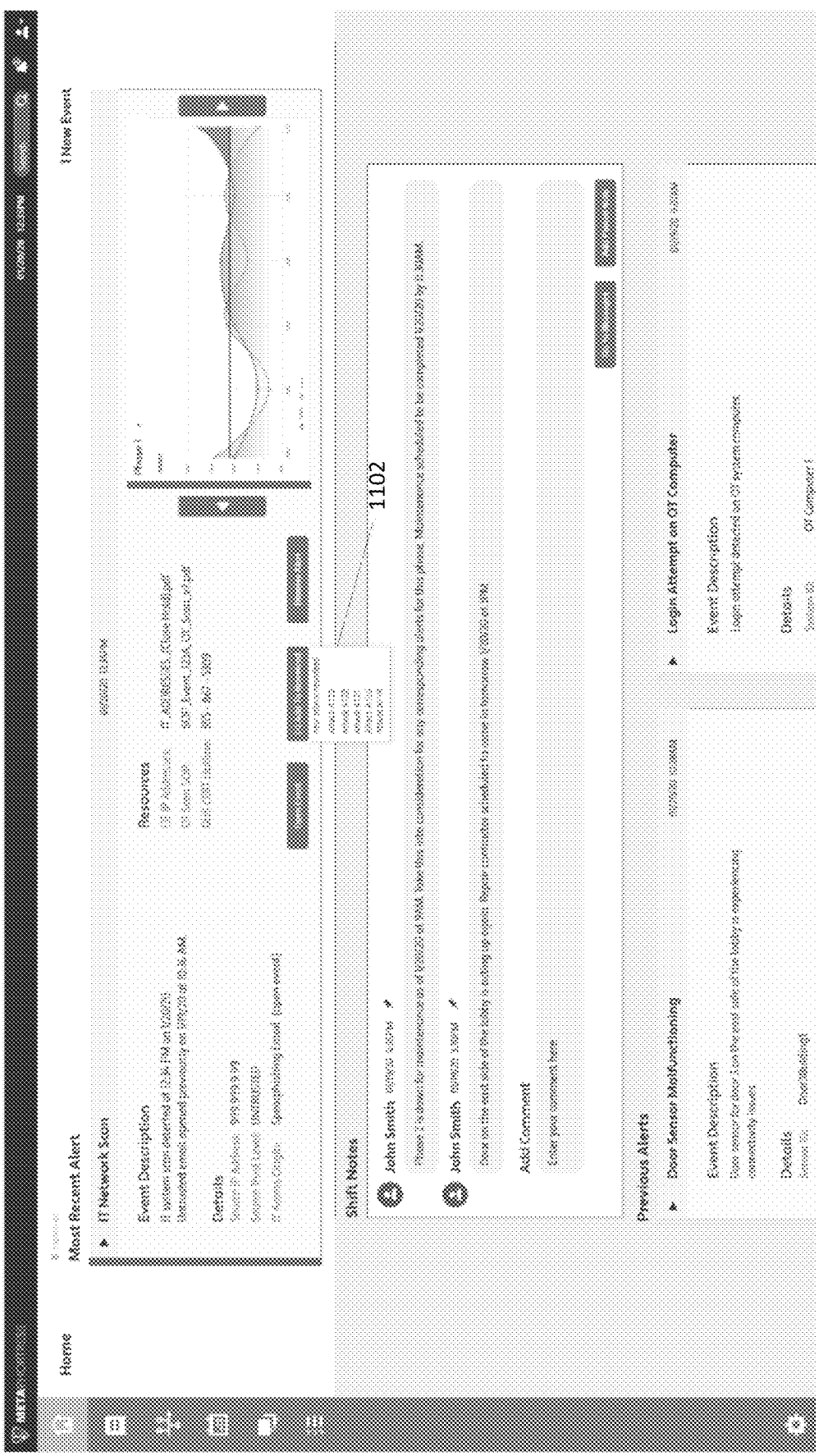
FIG. 11 is an exemplary display window for adding an event to a newsfeed in accordance with an exemplary aspect of the disclosure.

FIG. 11 is an exemplary display window for adding an event to a newsfeed in accordance with an exemplary aspect of the disclosure. A newsfeed may be a way of broadcasting events to other operators. In one embodiment, a drop-down menu 1102 may be provided to simplify adding an event to a newsfeed. The drop-down menu 1102 gives users the option to add an event to an existing attack newsfeed or to create a new newsfeed.

Figure 12:
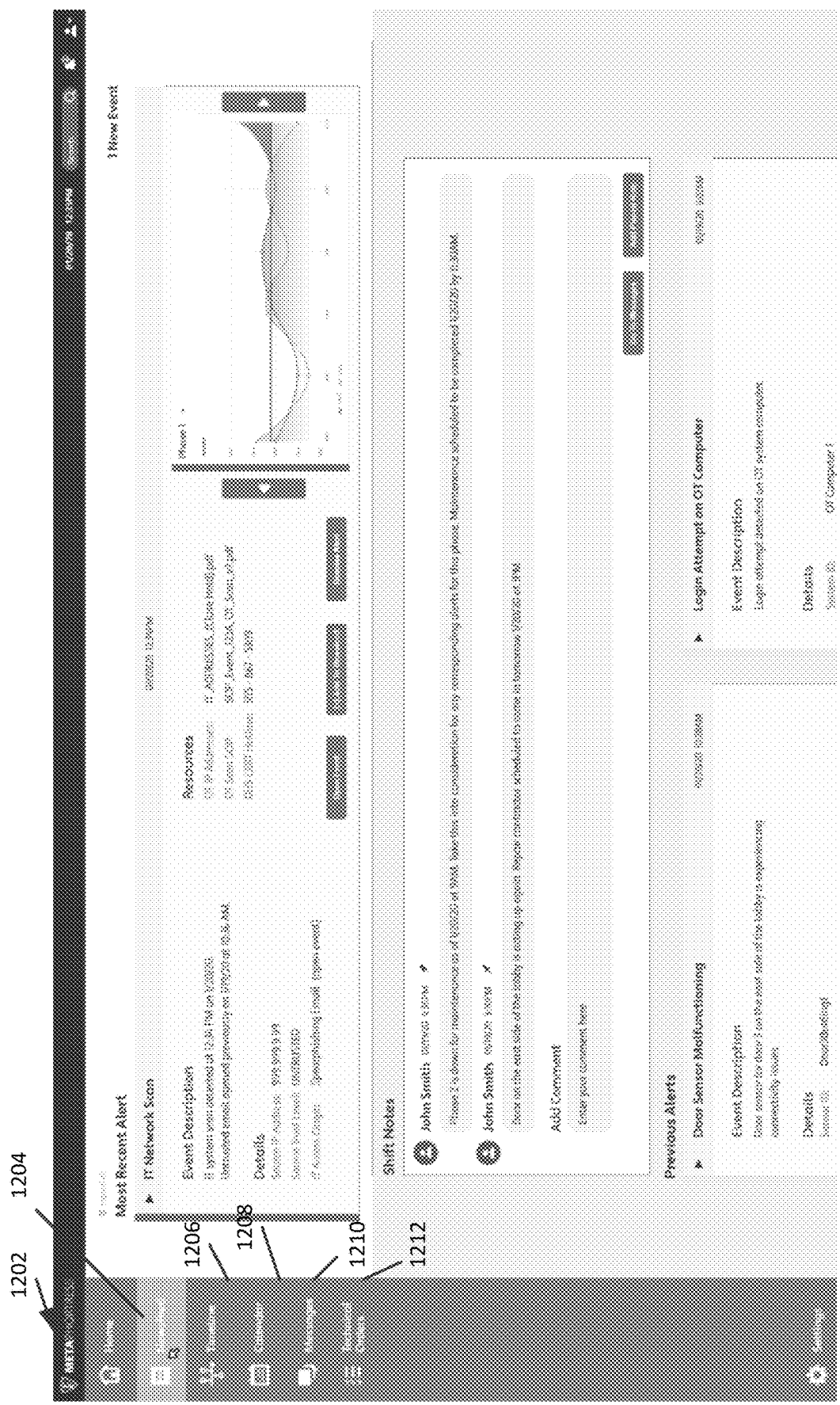
FIG. 12 is an exemplary display window showing hovering behavior in accordance with an exemplary aspect of the disclosure.

FIG. 12 is an exemplary display window showing hovering behavior in accordance with an exemplary aspect of the disclosure. An on-hover interaction reveals the labels associated with the side navigation functions in a sidebar 1202. A cursor can hover over the sidebar icons in order to view contextual information on-demand. The display strategy maximizes the real estate for data display until the user chooses to toggle the sidebar 1202. Referring to FIG. 12, the user is about to click into the newsfeed 1204. Other icons on the sidebar 1202 may include Timeline 1206, Calendar 1208, Messages 1210, and Technical orders 1212. In one or more embodiments, a newsfeed landing page may present a list or library of all user-defined attack newsfeeds.

Figure 13:
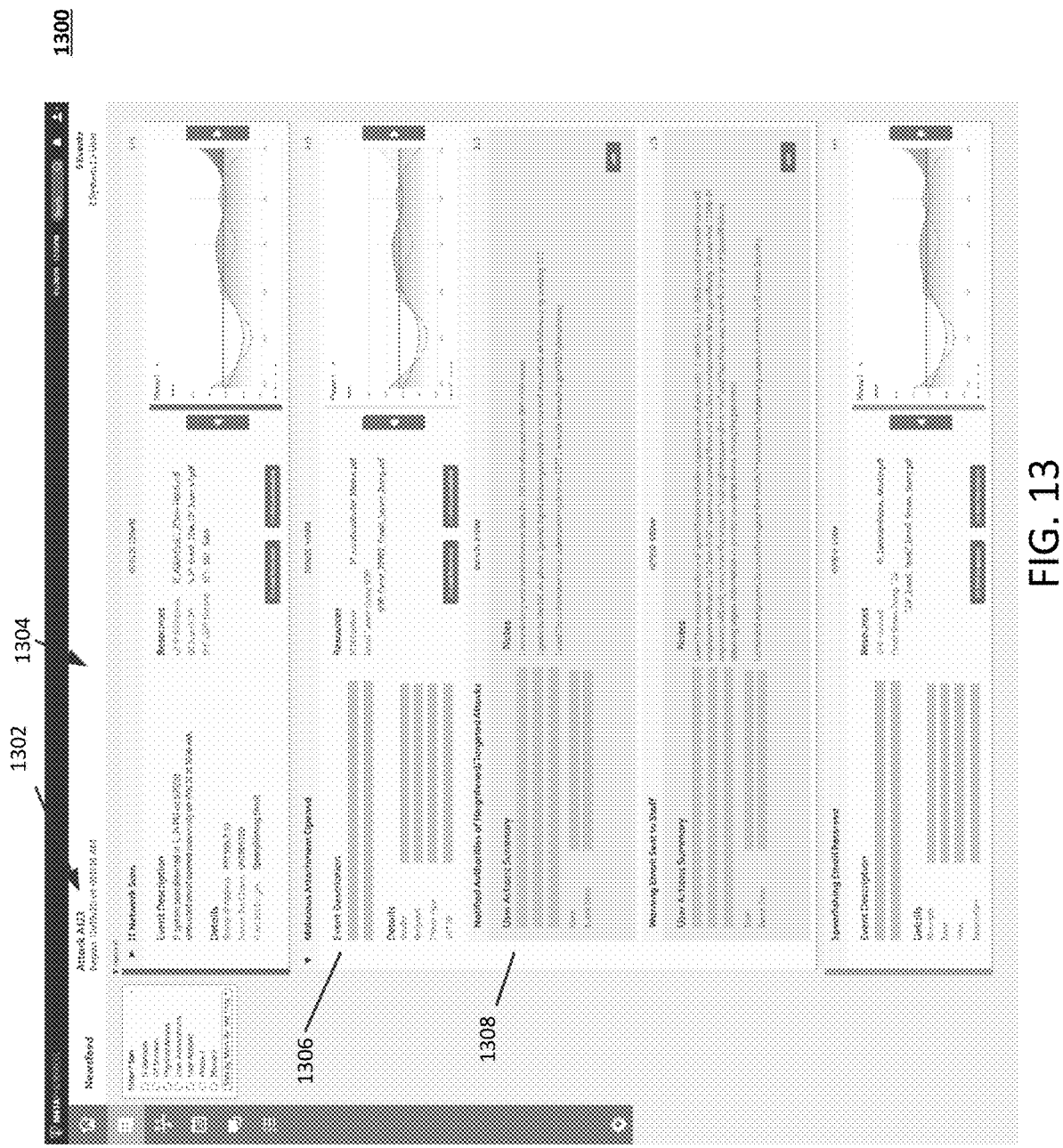
FIG. 13 is an exemplary display window for a newsfeed in accordance with an exemplary aspect of the disclosure.

FIG. 13 is an exemplary display window for a newsfeed in accordance with an exemplary aspect of the disclosure. A detailed newsfeed 1300 may be displayed for a particular attack 1302. A user may choose to rename the attack in order to meet security standards, to provide additional context. A user can view all the information 1304 they have added to the attack, as well as any responses or annotations from other users. Within "Malicious Attachment Opened" 1306, is an example display of originating information and annotation data. The display may distinguish between main events within the attack and the user-provided annotations and responses, user actions 1308.

Figure 14:
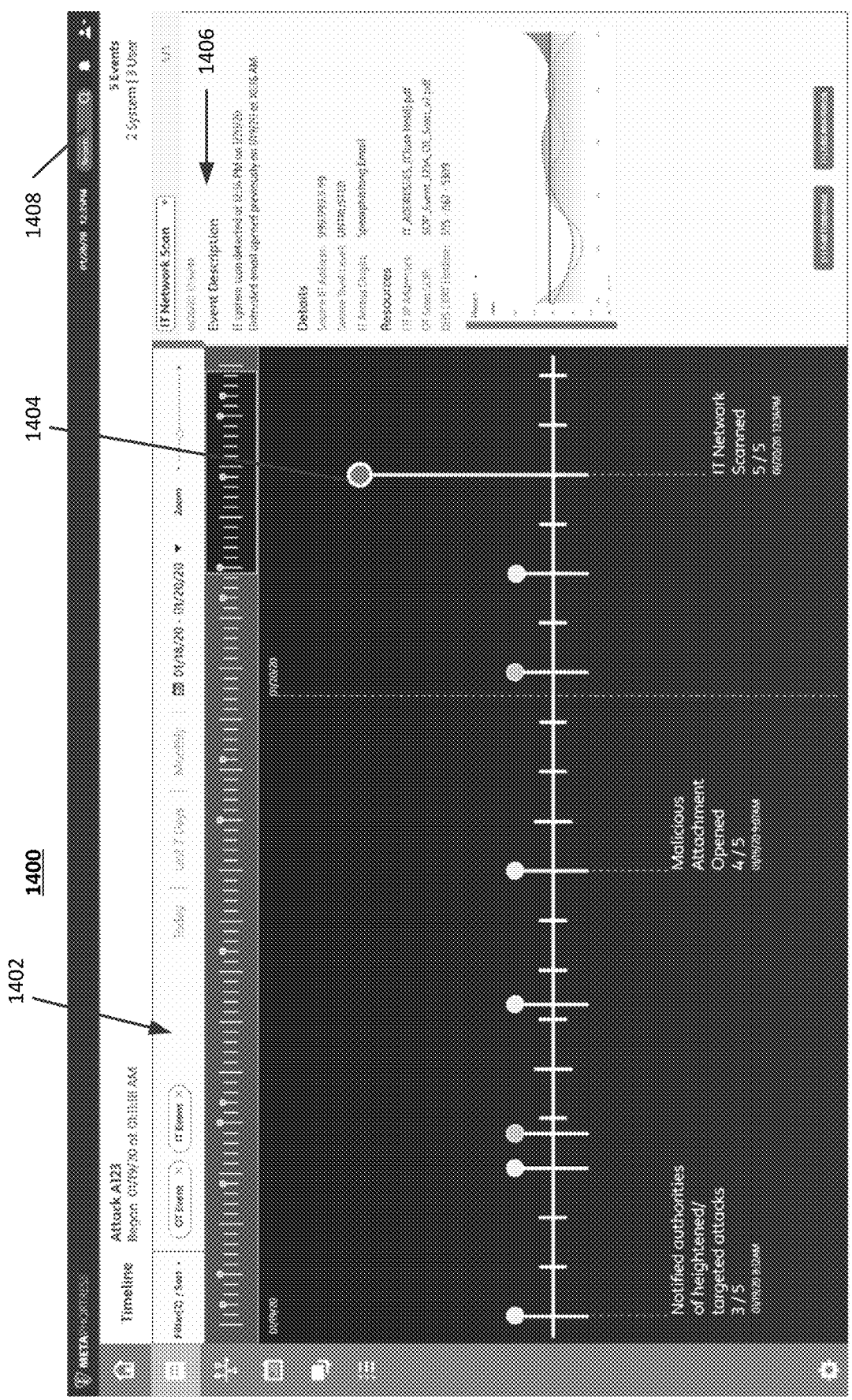
FIG. 14 is an exemplary display window for a timeline in accordance with an exemplary aspect of the disclosure.

FIG. 14 is an exemplary display window for a timeline in accordance with an exemplary aspect of the disclosure. The timeline 1400 is a global, synoptic, system information display. Previous newsfeeds 1402 are user-curated. If a user wants to add a previous event to an attack newsfeed, they can find the attack on the timeline (or by using a search operation 1408). The timeline displays everything entered into the situation awareness system 102, providing both the forest and the trees, i.e., a user can choose to view fine-grained detail about any system event 1404 while also viewing the larger context of individual attacks or linked events 1406.

Numerous modifications and variations of the present invention are possible in light of the above teachings. It is therefore to be understood that within the scope of the appended claims, the invention may be practiced otherwise than as specifically described herein.

The invention claimed is:

1. A method performed by a computer that has been programmed with instructions that cause the computer to function as a threat monitoring device for determining, for an industrial control system that performs an industrial control process within an industrial control facility over a data communication network, cross-correlated behaviors of an information technology (IT) domain, an operational technology (OT) domain, and a physical access (PA) domain of the industrial control facility, the method comprising:

receiving first sensor data from the IT domain, wherein the first sensor data received from the IT domain includes communication network traffic information transmitted over the data communication network by network devices;

receiving second sensor data from the OT domain, wherein the second sensor data received from the OT domain includes measurements and actions from particular sensors, actuators, and other components controlled by a controller of the industrial control system, the controller controlling a state of the industrial control process, and wherein the second sensor data includes at least one of a reliability of the industrial control system, a peak capacity of the industrial control system, emission levels of the industrial control system, a status of an operator of the industrial control system, or a response rate of the industrial control system; and receiving third sensor data from the PA domain, wherein the third sensor data received from the PA domain includes data from one or more of video surveillance systems, burglar alarm systems, and card-reader access control systems;

fusing the first, second, and third sensor data of each of the IT, OT, and PA domains, respectively, to obtain fused sensor data having a common format;

determining feature sets from the fused sensor data using behavior profiles;

constructing behaviors as sets of the features over particular time periods;

classifying the behaviors to determine a degree of anomaly;

classifying anomalous behaviors to determine a threat probability;

generating an alert based on the determined degree of anomaly and the determined threat probability; and displaying particular sensor data and particular time periods associated with the alert.

2. The method of claim 1, wherein the cross-correlated behaviors further includes an external data domain, wherein the receiving further includes receiving fourth sensor data from the external data domain, and wherein the fusing further includes fusing the first, second, third, and fourth sensor data of each of the domains to obtain the fused sensor data.

3. The method of claim 1, wherein the constructing step comprises constructing threat behaviors, including determining the sets of the features over the particular time periods.

4. The method of claim 1, wherein the step of classifying the behaviors includes determining the degree of anomaly with a machine-learning binary classifier.

5. The method of claim 1, wherein the step of classifying the behaviors includes scoring to reflect a likelihood of a threat using a machine-learning binary classifier.

6. The method of claim 1, wherein the step of generating the alert comprises processing via threat detection in order to provide a human-interpretable input.

7. The method of claim 1, further comprising determining the particular sensor data and the particular time periods associated with the alert from the constructed behaviors.

8. A monitoring device for determining, for an industrial control system that performs an industrial control process within an industrial control facility over a data communication network, cross-correlated behaviors of an information technology (IT) domain, an operational technology (OT) domain, and a physical access (PA) domain of the industrial control facility, the monitoring device comprising:
- data fusion circuitry configured to receive and fuse, into fused sensor data having a common format, first sensor data from the IT domain, wherein the first sensor data received from the IT domain includes communication network traffic information transmitted over the data communication network by network devices, second sensor data from the OT domain, wherein the second sensor data received from the OT domain includes measurements and actions from particular sensors, actuators, and other components controlled by a controller of the industrial control system, the controller controlling a state of the industrial control process, and wherein the second sensor data includes at least one of a reliability of the industrial control system, a peak capacity of the industrial control system, emission levels of the industrial control system, a status of an operator of the industrial control system, or a response rate of the industrial control system, and third sensor data from the PA domain, wherein the third sensor data received from the PA domain includes data from one or more of video surveillance systems, burglar alarm systems, and card-reader access control systems;
- data preparation circuitry configured to construct features from the fused sensor data using behavior profiles, and to construct behaviors as sets of the features over particular time periods;
- threat discovery circuitry configured to
  - classify the behaviors to determine a degree of anomaly,
  - classify the anomalous behaviors to determine a threat probability, and
  - generate an alert based on the determined degree of anomaly and the determined threat probability; and
- presentation circuitry configured to display particular sensor data and particular time periods associated with the alert.

9. The monitoring device of claim 8, wherein in the data preparation circuitry the constructing step comprises constructing threat behaviors, including determining the sets of the features over the particular time periods.

10. The monitoring device of claim 8, wherein in the threat discovery circuitry the step of classifying the behaviors includes determining the degree of anomaly with a machine-learning binary classifier.

11. The monitoring device of claim 8, wherein in the threat discovery circuitry the step of classifying the behaviors includes scoring to reflect a likelihood of a threat using a machine learning binary classifier.

12. The monitoring device of claim 8, wherein in the threat discovery circuitry the step of generating the alert comprises processing via threat detection in order to provide a human-interpretable input.

13. The monitoring device of claim 8, wherein the presentation circuitry is further configured to determine the particular sensor data and the particular time periods associated with the alert from the constructed behaviors.

14. A monitoring device for determining, for an industrial control system that performs an industrial control process within an industrial control facility over a data communication network, cross-correlated behaviors of an information technology (IT) domain, an operational technology (OT) domain, and a physical access PA domain of the industrial control facility, the monitoring device comprising:
- data ingestion circuitry configured to receive, via a streaming service, first sensor data from the IT domain, wherein the first sensor data received from the IT domain includes communication network traffic information transmitted over the data communication network by network devices, second sensor data from the OT domain, wherein the second sensor data received from the OT domain includes measurements and actions from particular sensors, actuators, and other components controlled by a controller of the industrial control system, the controller controlling a state of the industrial control process, and wherein the second sensor data includes at least one of a reliability of the industrial control system, a peak capacity of the industrial control system, emission levels of the industrial control system, a status of an operator of the industrial control system, or a response rate of the industrial control system, and third sensor data from the PA domain, wherein the third sensor data received from the PA domain includes data from one or more of video surveillance systems, burglar alarm systems, and card-reader access control systems, and to receive, via a bulk ingestion service, the first sensor data from the IT domain, the second sensor data from the OT domain, and the third sensor data from the PA domain;
- data preparation circuitry configured to perform online data preparation and offline data preparation, including determining feature sets from the streamed sensor data and the bulk ingested sensor data using behavior profiles, and constructing behaviors as sets of the features over particular time periods;
- machine learning model training circuitry configured to train a plurality of domain machine learning models, including one for each of the IT, OT, and PA domains, and including, for each domain model, mapping each domain to its own domain machine learning model, each domain's machine learning model producing independent results, and then the machine learning model training service training a cross-correlation machine learning model to perform cross-correlation across those domain machine learning model results to find and analyze cross-domain anomalies;
- machine-learning model scoring circuitry configured to select selected machine learning models from among the plurality of domain machine learning models by performing a scoring process; and performance monitoring circuitry configured to evaluate the performance of the selected domain machine learning models.

15. The monitoring device of claim 14, wherein the machine-learning model training circuitry is further configured to train machine-learning classifiers to learn which features best predict whether the data is likely to indicate normal behavior or attack behavior.

16. The monitoring device of claim 15, wherein the machine-learning model training circuitry is further configured to train support vector machines (SVM) to focus on the aggregation of extracted features, by operating on threat behaviors to train models to classify threats, and wherein each SVM breaks up extracted features into parts and partitions the parts into disjoint subsets.

17. The monitoring device of claim 15, wherein the machine-learning model training circuitry is further configured to utilize a continuous-valued score between a first value and a second value, where the score signifies the likelihood that the data represents an attack, where the first value signifies absolutely normal traffic and the second value signifies certain attack.

18. The monitoring device of claim 15, wherein the machine-learning model training circuitry is further configured to utilize regression trees which ingest real-time data and generate operator and watchstander continuous-valued scores with varying degrees of severity between a first value and a second value.

* * * * *